(12) United States Patent
Vichniakov

(10) Patent No.: US 10,941,804 B2
(45) Date of Patent: Mar. 9, 2021

(54) HOT JOINT FASTENER

(71) Applicant: Airbus Operations GmbH, Hamburg (DE)

(72) Inventor: Alexei Vichniakov, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 517 days.

(21) Appl. No.: 15/839,268

(22) Filed: Dec. 12, 2017

(65) Prior Publication Data

US 2018/0163769 A1 Jun. 14, 2018

(30) Foreign Application Priority Data

Dec. 12, 2016 (EP) ..................................... 16203398

(51) Int. Cl.
*F16B 37/06* (2006.01)
*B29C 65/16* (2006.01)
(Continued)

(52) U.S. Cl.
CPC ............. *F16B 37/067* (2013.01); *B21J 15/08* (2013.01); *B29C 65/562* (2013.01); *B29C 66/0242* (2013.01); *B29C 66/1122* (2013.01); *B29C 66/41* (2013.01); *B29C 66/721* (2013.01); *B29C 66/72143* (2013.01); *B29C 66/7392* (2013.01); *B29C 66/73941* (2013.01);
(Continued)

(58) Field of Classification Search
CPC ........ F16B 37/067; F16B 25/00; F16B 39/02; B29C 66/721; B29C 66/41; B29C 66/1122; B29C 66/0242; B29C 66/72143; B29C 66/73941; B29C 66/7392; B29C 66/71; B29C 66/7212; B29C 66/73117; B29C 66/72141; B29C 65/562; B29C 65/10; B29C 65/1412; B29C 65/1425; B29C 65/02; B21J 15/08; B29L 2031/3076; B29L 2031/30

See application file for complete search history.

(56) References Cited

U.S. PATENT DOCUMENTS

| 7,966,711 B2 * | 6/2011 | Keener | ................. B29C 65/562 29/458 |
| 2009/0047100 A1 * | 2/2009 | Keener | .................. F16B 39/02 411/501 |

(Continued)

FOREIGN PATENT DOCUMENTS

| EP | 2025954 | 2/2009 |
| JP | H05 245941 | 9/1993 |

(Continued)

OTHER PUBLICATIONS

European Search Report, dated May 31, 2017, priority document.

*Primary Examiner* — Bayan Salone
(74) *Attorney, Agent, or Firm* — Greer, Burns & Crain, Ltd.

(57) ABSTRACT

A method for joining together different components or different sections of a single component, wherein at least one of the components is a thermoplastic fiber composite component, by using a threaded fastener. Heat is used for softening the thermoplastic fiber composite component to be joined together with the threaded fastener. A joined-together fiber composite component of a vehicle, aircraft or spacecraft, can be obtained by the disclosed method.

19 Claims, 23 Drawing Sheets

(51) Int. Cl.
*B29C 65/14* (2006.01)
*B29C 65/56* (2006.01)
*B29C 65/10* (2006.01)
*B29C 65/02* (2006.01)
*B29C 65/08* (2006.01)
*B64C 1/12* (2006.01)
*F16B 5/04* (2006.01)
*B21J 15/08* (2006.01)
*F16B 25/00* (2006.01)
*F16B 39/02* (2006.01)
*B29C 65/00* (2006.01)
*B29L 31/30* (2006.01)
*B29K 81/00* (2006.01)
*B29K 101/10* (2006.01)
*B29K 101/12* (2006.01)

(52) U.S. Cl.
CPC ............ *B64C 1/12* (2013.01); *F16B 25/0015* (2013.01); *F16B 39/02* (2013.01); *B29C 65/02* (2013.01); *B29C 65/08* (2013.01); *B29C 65/10* (2013.01); *B29C 65/1412* (2013.01); *B29C 65/1425* (2013.01); *B29C 65/16* (2013.01); *B29C 66/71* (2013.01); *B29C 66/7212* (2013.01); *B29C 66/72141* (2013.01); *B29C 66/73115* (2013.01); *B29C 66/73117* (2013.01); *B29C 2793/0045* (2013.01); *B29K 2023/06* (2013.01); *B29K 2081/04* (2013.01); *B29K 2101/10* (2013.01); *B29K 2101/12* (2013.01); *B29L 2031/30* (2013.01); *B29L 2031/3076* (2013.01); *B29L 2031/3097* (2013.01); *F16B 5/04* (2013.01)

(56) References Cited

U.S. PATENT DOCUMENTS

2013/0273312 A1\* 10/2013 Campbell ............. B29C 66/742
428/137
2015/0176623 A1\* 6/2015 Vogel .................. F16B 25/0063
411/387.4

FOREIGN PATENT DOCUMENTS

WO    2014036986        3/2014
WO    WO-2016202877 A1 \* 12/2016 ......... B29C 66/1122

\* cited by examiner

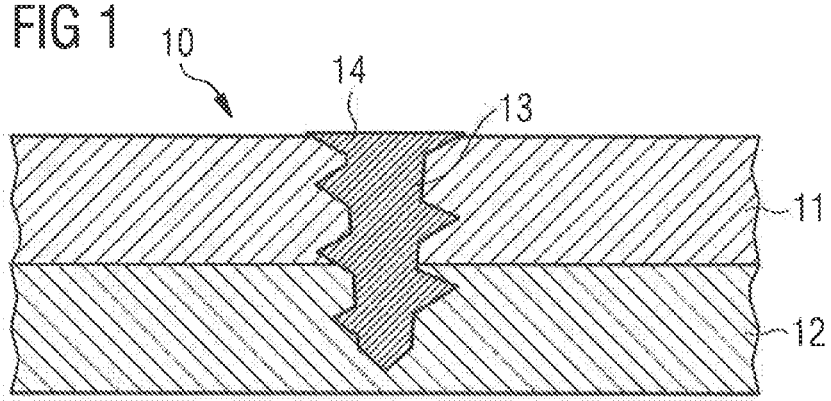
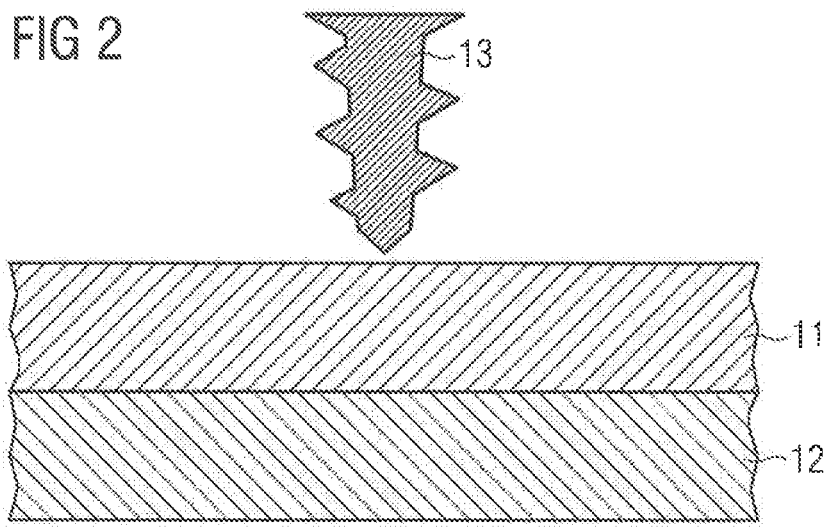
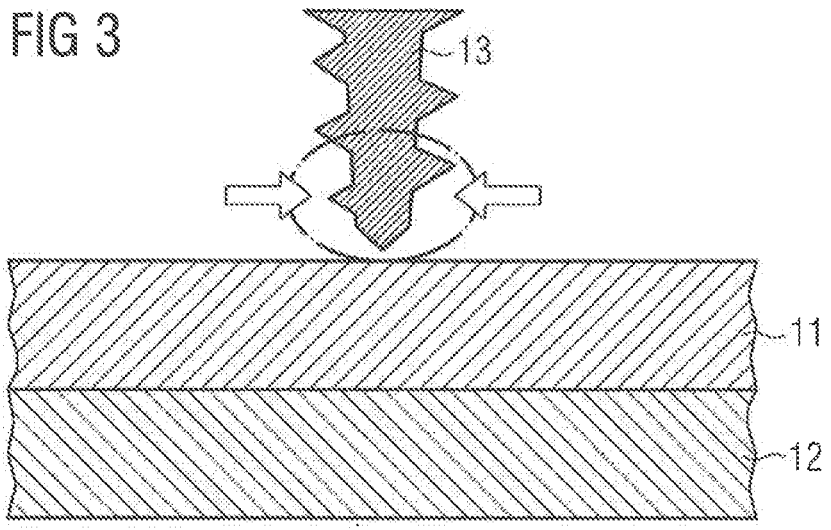

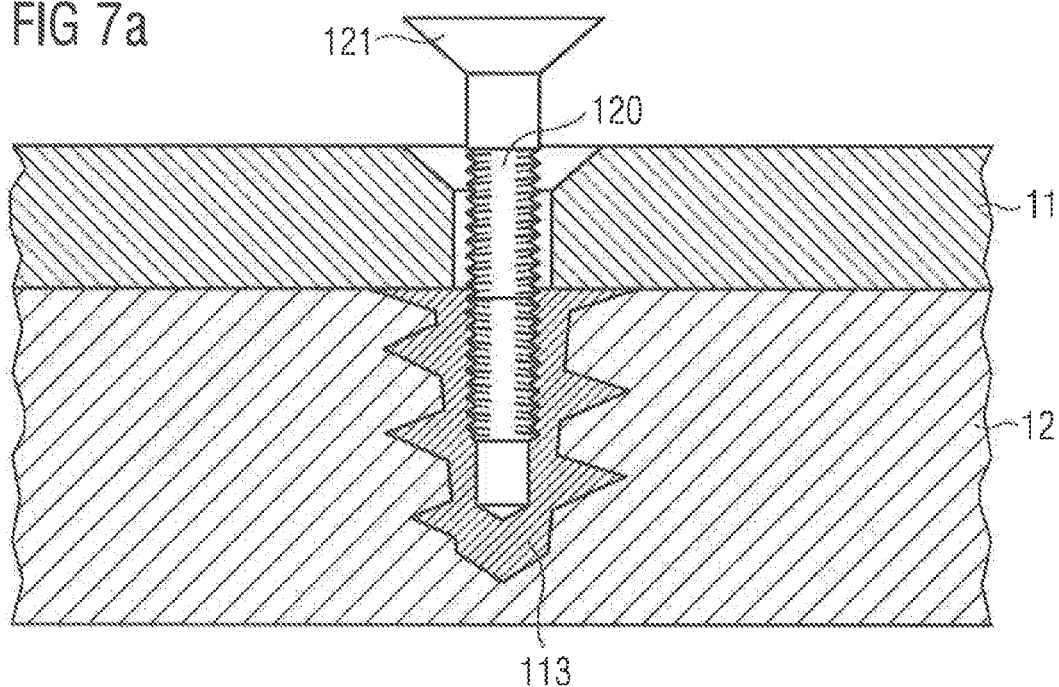
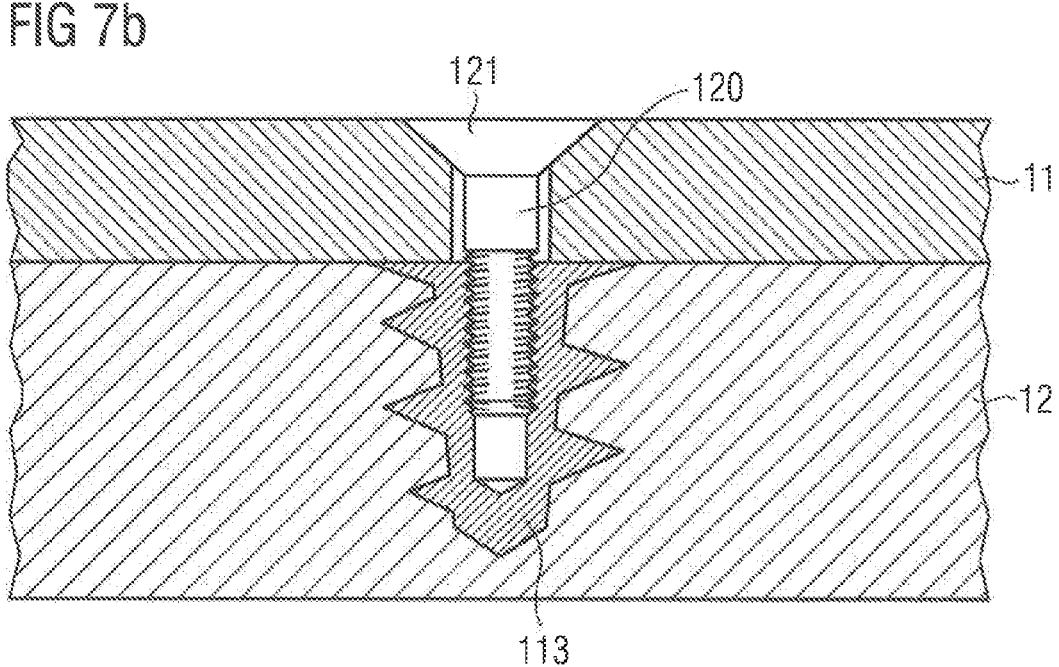

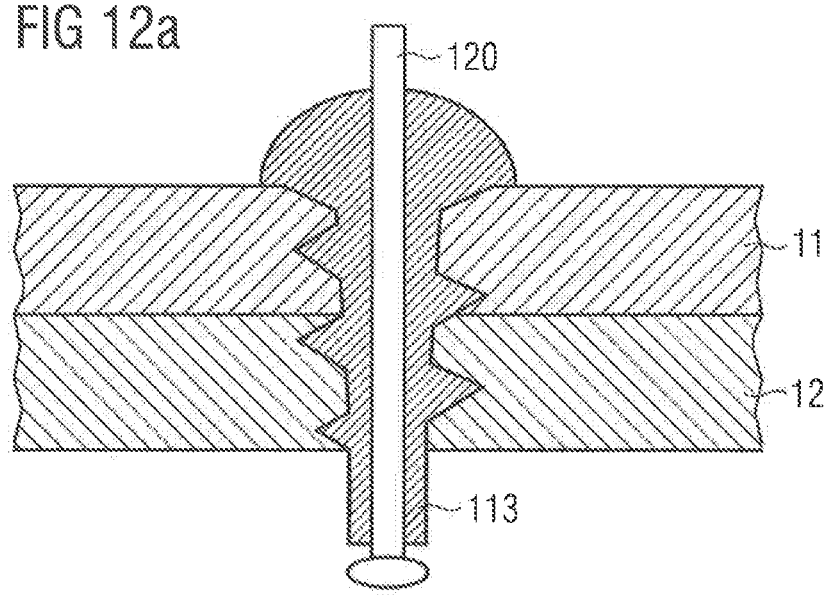
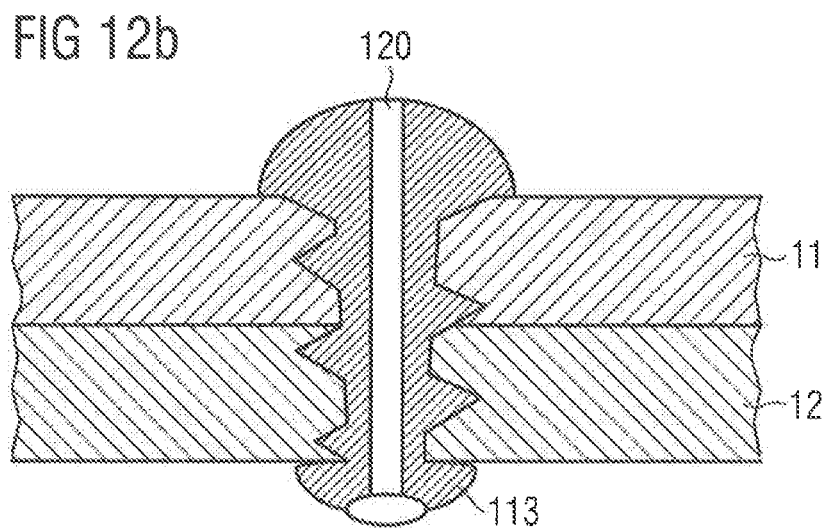

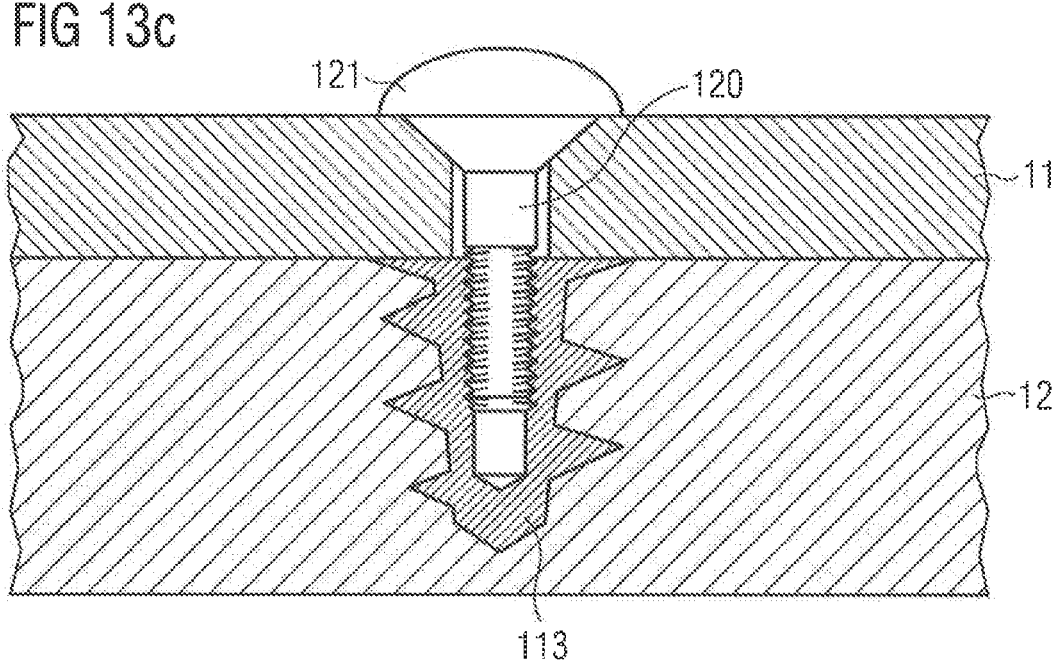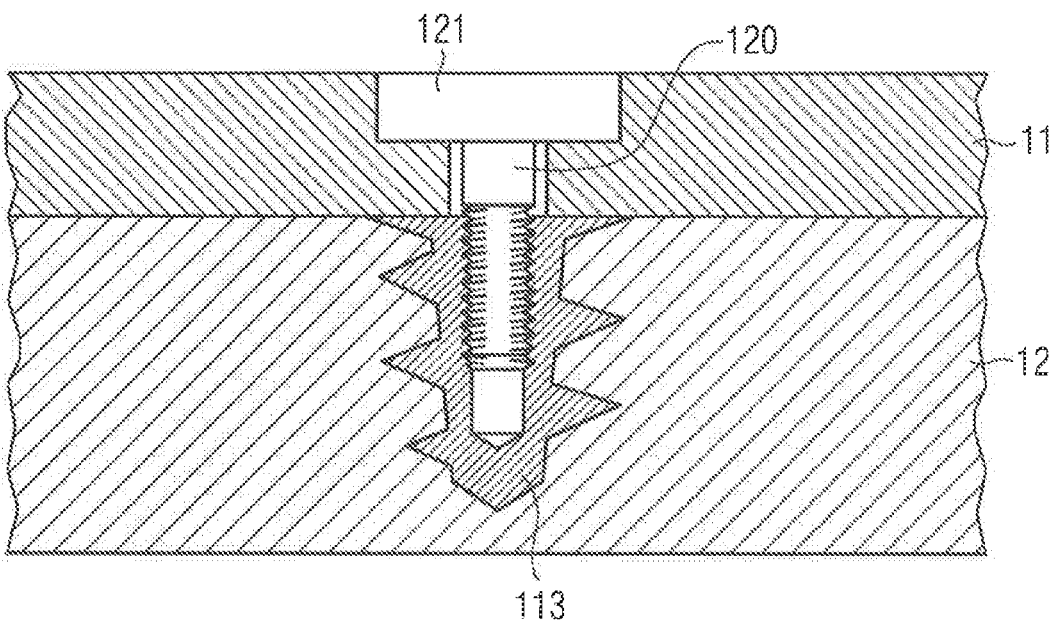

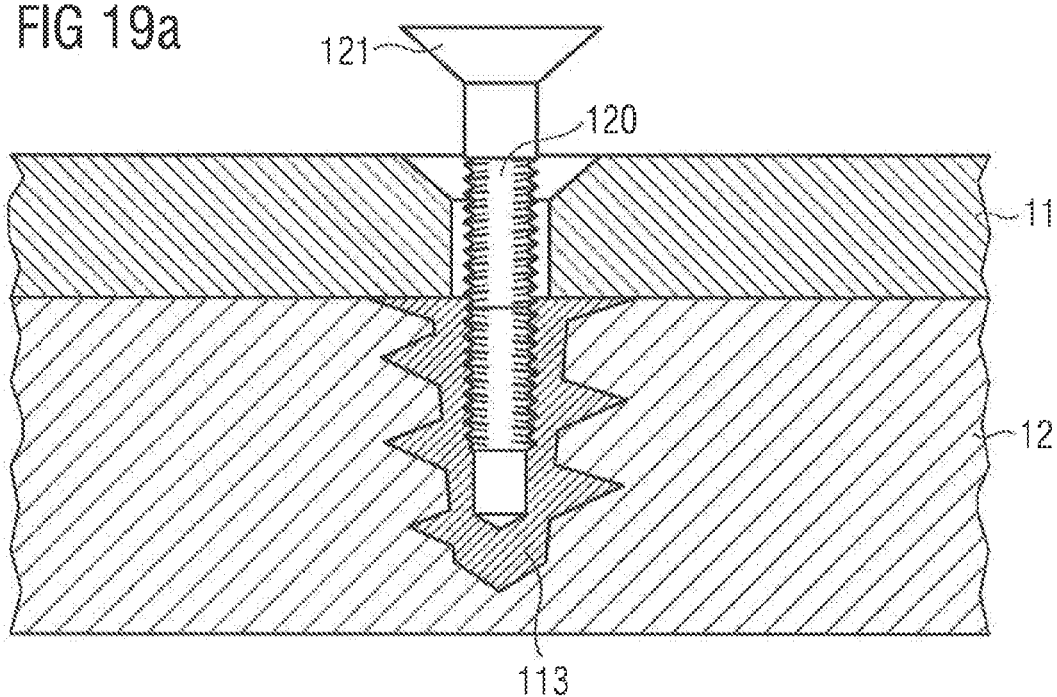
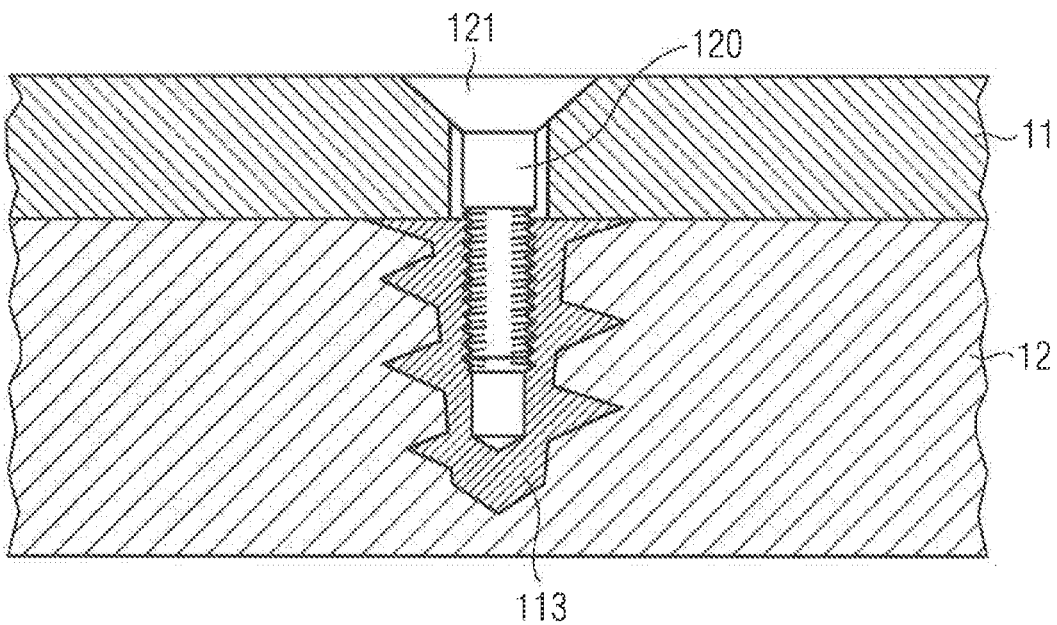

FIG 23a
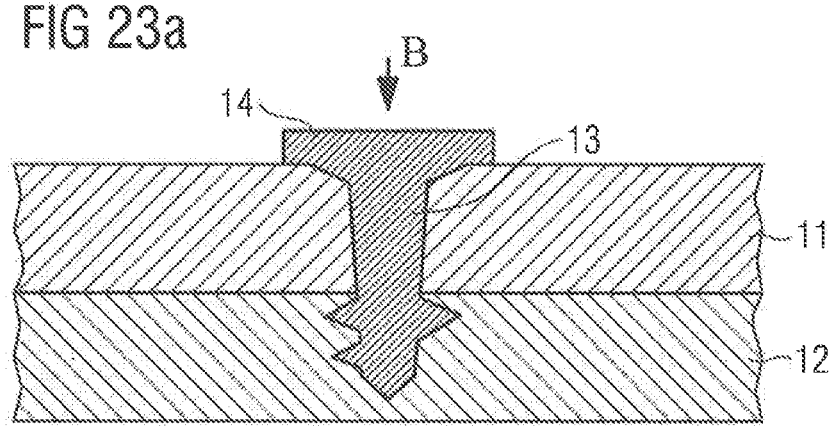
FIG 23b
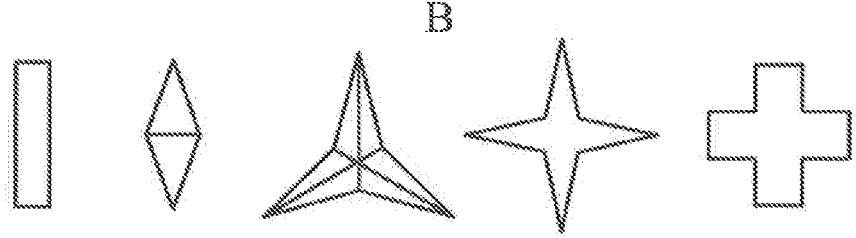
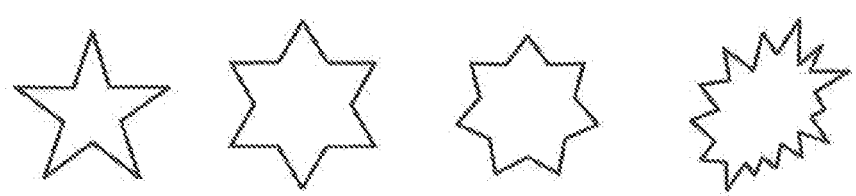

HOT JOINT FASTENER

CROSS-REFERENCES TO RELATED APPLICATIONS

This application claims the benefit of the European patent application No. 16203398.9 filed on Dec. 12, 2016, the entire disclosures of which are incorporated herein by way of reference.

BACKGROUND OF THE INVENTION

The present invention refers to a method for joining together different components or different sections of a single component, wherein at least one of the components is a thermoplastic fiber composite component, by using a fastener, wherein heat is applied to soften the thermoplastic fiber composite component. The invention further refers to the use of heat for joining together the component(s) by using a fastener. The invention also refers to a joined-together fiber composite component of a vehicle, aircraft or spacecraft, obtainable or obtained by the method of the invention.

In aircraft construction, efforts are being made to use, as load-bearing components, components that are made entirely or partially of fiber reinforced composite materials, for example carbon fiber reinforced plastics (CFRP). It is further known to provide aircraft fuselage segments with a skin and reinforcing elements (for example frames, stringers) made of fiber reinforced composite materials. These components can be joined, i.e., fixed together or mounted, by using bolts, nuts, screws and/or similar fasteners.

The reinforced composite materials are often thermoplastic fiber composite components. Thermoplastic connections are known and are generally realized by fusing/welding the layers to be joined. Compared with thermosets, thermoplastics generally have poorer behavior with respect to creep, this being of significance, particularly in aircraft construction.

Fastening of fiber composite components via drilled holes has several disadvantages. Structural disadvantages of drilled holes are that the fibers are cut during the drilling process and that there is a risk of delamination of the composite material. There are also manufacturing issues, since such a process requires a complex process chain with different operations. Furthermore, carbon dust is created and there is a need of sealant for hermetization as well as a long lead time in case of shimming.

Self-piercing rivets (SPR) also have disadvantages. Structural disadvantages are that they are applicable only for metallic materials and there is a risk of crack formation and reduction of fatigue behavior. Also manufacturing issues exist such as needs of sealant for hermetization.

Likewise, thermoplastic welding has structural disadvantages such as low mechanical behaviors, because of no connection between fibers in different parts. Also manufacturing issues exist, such as the need of high pressure over complete joining area and a high temperature over complete joining area.

There was therefore a need to reduce the efforts involved in the assembly of components, including a thermoplastic fiber composite component. Also, a need for improved stability of the joints existed.

SUMMARY OF THE INVENTION

The present invention solves the posed problem by providing a method for joining together components, wherein the method comprises a step of heating at least the component which is a thermoplastic fiber composite material while a fastener is screwed into the component. Further features and benefits are described below.

The present invention provides several benefits over the know methods. First of all, compared to the welding method, it is only required to locally apply a high temperature instead of having to heat the whole components. The method of the present invention can be used if just one of the components to be joined is a thermoplastic fiber composite material, i.e., a fastener comprising a thread can be inserted into the thermoplastic fiber composite material by using heat and providing the benefits of the invention. The method of the present invention does not require to drill holes prior to or during insertion of the fastener, but can rely on self-screwing principles. However, it is of course possible to drill through holes into the components which are not thermoplastic fiber composite materials and apply the method of the present invention without drilling holes into the thermoplastic fiber composite components.

The joints obtained by the method of the present invention provide an increased strength compared with thermoplastic welding. In the method of the present invention, the thread of the fastener moves the fibers and thermoplastic material of the heat softened thermoplastic fiber composite aside. Compared with a drilled hole, the fibers are not cut in this case. Since the present invention avoids cutting of the fibers, the fibers essentially remain continuous. The presence of continuous fibers around the fastener further increases the performance of the joint. The method is also applicable to thermoplastic materials reinforced with short fibers and nanoparticles. The core of the present invention refers to the use of a fastener with a thread within the thermoplastic composite component and the remaining part of the fastener, or further components, e.g., bolts, for fixing the fastener, can be chosen to provide further benefits. For example, the end of the fastener can be fixed by deformation or can be fixed by using a fastener head. It is also possible to use blind fasteners or other principles and many options for putting the invention into practice can be used.

The present invention thus refers to a method for joining together different components or different sections of a single component, comprising the steps of:

a) providing one or more components, wherein at least one of the components is a thermoplastic fiber composite component, preferably reinforced with short fibers, and/or continuous fibers, and/or nanoparticles, preferably including continuous fibers, including a thermoplastic material, optionally, to be joined together at one or more positions, and a fastener comprising a thread, or at least one component of a fastener, which component comprises a thread, b) positioning the one or more components, or sections of the single component on top of each other, c) heating at least a portion of the at least one thermoplastic fiber composite component, and optionally also portions of the other components to be joined, at one or more positions where the components are to be joined and/or heating the fastener or the at least one component of a fastener, and d) screwing the fastener, or the at least one component of a fastener, into at least the bottom component at the one or more positions, wherein a further component of a fastener is fixed with the at least one component of a fastener, to join the component(s) together, wherein step (c) can be performed prior to and/or during step (d).

Step (a) includes providing the components and fastener. The term "thermoplastic fiber composite component" as used herein refers to a component comprising or consisting of fibers embedded in a polymer matrix. The term "component" refers to any 3-dimensional structure/article which is to be joined with another structure/article, e.g., a panel, by means of a fastener. Preferred components are described further below. The polymer matrix of the fiber composite includes or consists of a thermoplastic material. The term "thermoplastic fiber composite component" is the same as fiber reinforced composite materials.

In one embodiment, the thermoplastic fiber composite component comprises, preferably consists of, more than 0 wt.-% and up to 80 wt.-% of fibers and/or nanoparticles, preferably continuous fibers, and from 20 wt.-% to less than 100 wt.-% of thermoplastic material.

Preferably, the thermoplastic fiber composite component comprises, preferably consists of, 10 wt.-% to 70 wt.-%, preferably 30 wt.-% to 65 wt.-%, or 45 wt.-% to 65 wt.-% of fibers and/or nanoparticles, preferably continuous fibers, and 30 wt.-% to 90 wt.-%, preferably at least 35 wt.-% to 70 wt.-%, or 35 wt.-% to 60 wt.-%, or 35 wt.-% to 50 wt.-%, of thermoplastic material. In one embodiment, the thermoplastic fiber composite component comprises, preferably consists of 55 wt.-% to 65 wt.-% of fibers and/or nanoparticles, preferably continuous fibers, and 35 wt.-% to 45 wt.-% of thermoplastic material. The thermoplastic material can, e.g., have a glass transition temperature of above 80° C.

In one embodiment, the thermoplastic fiber composite component comprises, preferably consists of, about 60 wt.-% of continuous fibers and about 40 wt.-% of thermoplastic material, wherein the thermoplastic material optionally includes short fibers and/or nanoparticles.

The other components, i.e., the components which are not thermoplastic fiber composite components, can be freely chosen, provided that they can be fixed with a fastener. In the process described herein, the components are positioned on top of each other. If one component is used, it can be bent or folded to have overlapping sections. If one or more bottom component(s) are made of a thermoplastic fiber composite component, this/these can be used for inserting a fastener comprising a thread. It is possible that this fastener either extends also into the other components or the other components are fixed to the fastener by using a further component, e.g., a bolt. To insert the bolt, it is an option to provide through holes into the other components and to fix the fastener by means of the bolt wherein the bolt then extends through all components (see e.g., FIG. 13a/b). It is also possible that both the fastener with the thread and the bolt extend through all components (see e.g., FIG. 12a/b).

Step (b) includes positioning of the component(s). If a single component is to be joined with itself, different sections of the component are joined with each other. For example, a flat sheet can be formed into a tube and overlapping portions of the flat sheet can be joined together. Positioning the components on top of each other does not exclude the use of spacers, sandwiched components which are not fixed, or leaving voids between the components.

Heating step (c) is applied to soften the thermoplastic material. The required temperature therefore depends on how soft the thermoplastic material shall become and further depends on the glass transition temperature of the material. Suitable temperatures should be higher than the glass transition temperature but below the melting temperature and can be determined as process parameters depending on the applied materials, fasteners and equipment.

The glass transition temperature (Tg) is one specific thermophysical property of amorphous polymers. The glass transition is a complex process for thermoplastic materials that is affected by a number of different factors, including fiber volume content, heating rate, ageing history, morphology, etc.

Glass transition temperature (Tg) is a temperature where a polymer begins to exhibit a reduction in modulus.

| TP material | Glass transition temperature Tg (° C.) | Melting temperature Tm (C. °) |
| --- | --- | --- |
| PPS | 90-95 | 278-290 |
| PEI | 210 | 360 |
| PEEK | 156 | 310 |
| PEKK | 143 | 343 |

For example, it is possible for materials with PPS resin to heat the fastener to a temperature of at least 100° C. and/or the thermoplastic fiber composite component to a temperature of at least 90° C., or at least 120° C., or at least 150° C. Temperatures where the properties of the thermoplastic materials are degraded should be avoided. Completely melting the polymer should also be avoided, i.e., the softening temperature should be well below the melting point of the thermoplastic material. For example, an upper limit for the temperature of the fastener for materials with PPS resin is 285° C. and is 285° C. for the thermoplastic fiber composite component.

The heating in step (c) can, for example, be performed with ultrasound, hot air, microwave radiation, laser radiation, electric current, electromagnetic induction and/or IR radiation. In particular, inner parts can be heated by ultrasound, hot air, microwave radiation, laser radiation, electromagnetic induction and/or IR radiation. The fastener, preferably metallic fastener, can, e.g., be heated by applying electric current. The aim of heating the fastener and/or the component (at the position where the fastener is to be inserted/screwed into) is to soften the polymeric material, in particular to the effect that the fastener moves aside the polymeric material and fibers without cutting and removing same, like in a drilling method. As with the temperature which is required for softening, a skilled person can also determine the minimum area of the surface or inner part of the components in order that the fastener can be screwed into the component(s) as desired.

Accordingly, the heating is preferably performed at one surface or opposing surfaces of the one or more components, which are positioned on top of each other, at positions where the components are to be joined. Of course, heating the surfaces provides that the inner part is also (indirectly) heated. In a preferred embodiment, a homogenous temperature profile is provided in the heated component with the highest temperature at the positions for insertion of the fasteners and about the same temperature along the axis for insertion of the fasteners. It is also possible to modify the temperature profile in dependence of the form of the thread with greater diameters requiring a softer polymer, i.e., higher temperature. For example, if the component(s) is/are heated only on the surface of one side, there will be a temperature gradient along the axis of insertion.

It is also possible to heat at an inner part of one or more of the one or more components which are to be joined. That is, the energy input, or at least its maximum, is not located at a surface of the component(s), but is located in the inner part.

The components are preferably placed in contact which each other, at least at the positions where they are joined together. Subsequently, prior to or after step (c), the fasteners are positioned at the one or more positions where the component(s) will be joined. This positioning can be performed by applying holes, marker and any other principles for allowing a quick positioning. This means that it is possible to heat the fasteners and/or the components and then bring the fasteners in position for screwing, or it is possible to first bring the fasteners in position for screwing and then heat the fasteners and/or the components.

Fixing the further component to the at least one component comprising a thread can e.g., be performed by riveting or bolting the further component of the fastener to the at least one component of the fastener comprising a thread.

In step (d), the fastener is screwed into at least one component (or section of one component), e.g., one component (or section), several components (or sections), or all components (sections). In one embodiment, the fastener is screwed into all components which are positioned on top of each other.

If the fastener is made of a single component, e.g., a screw, the fastener has to extend through all components to join them, while one or more components can have a through hole before the fastener is inserted. However, it is preferred that the thermoplastic composite components do not have a through hole. If the fastener is made of one component, e.g., a screw, the fastener is screwed into all components and fixing is then either completed or (a) further step(s) is/are required such as deforming the end of the fastener which is protruding beyond the components.

The fastener can also comprise more than one component, e.g., two components, which act together to fix the components. In such an embodiment, at least one component of a fastener, which component comprises a thread, is screwed into the component(s). This is preferably done in one or more bottom components. The components are positioned on top of each other and the bottom component is the outermost component and the at least one component comprising a thread is screwed into the bottom component with the tip of the screw pointing in a direction opposite to the other components.

If the fastener comprises more than one component, e.g., two components, which act together to fix the components, at least one component of a fastener, which component comprises a thread, is screwed into the component(s) and a further component is used for engaging with the component to fix the fastener. For example, a nut or a bolt can be used as the further component. The nut can be put on the component comprising a thread to fix the fastener. A bolt can be inserted into the component comprising a thread to, e.g., form a rivet joint.

Accordingly, the fastener can be a screw, the at least one component of a fastener, which comprises a thread, can be an insert of a rivet, e.g., of a drive rivet or a blind rivet, and the at least further component can be a bolt. The fastener can be used for permanent fixation or can be made removable. Removing the fastener may again require applying heat to soften the thermoplastic material.

In general, the components are not welded together by the process of the present invention. However, if two thermoplastic components are joined together, they may bond together (by welding) at the positions where they are heated in step c).

The fastener comprising a thread is configured for applying a pressure force and/or torque for screwing. This can be done by using methods and devices known in the art. The fastener, the at least one component of a fastener, and the further component of a fastener, is predominantly made of a metal or a metal alloy. Suitable materials are the same as used in common screw and rivet applications.

Suitably, also fasteners produced from materials with reinforcements with fibers or nanoparticles can be used. Also various ceramic materials can be used as fasteners. Also fasteners produced from polymeric materials with Tg higher than Tg of the materials to be joined can be used. As an example, fasteners produced with PEKK resin can be used for joining of thermoplastic materials with PPS resin.

The thread of the fastener, or of the at least one component, can be dimensioned to be in all components, i.e., extend through all components when the fastener is in its final position, which components are positioned on top of each other, or can be dimensioned to be present only in the bottom component and optionally further components, but not in the top component(s), leaving an unthreaded part at least in the top component(s). The at least one fastener component comprising a thread can also have a (partial) inner thread for fixing the bolt as exemplified in FIGS. 18 and 19.

The head and the slots in the head of the fastener can have different forms as shown in FIGS. 8, 13, 14, 15-17, e.g., biangle, triangle, square, pentagon, hexagon and polygons as well as star-shaped forms and mixtures thereof.

The at least one component can be screwed into all components which are positioned on top of each other, or can be screwed only into the bottom component and optionally further components, but not into the top component(s).

Step (d) comprises screwing the fastener into the components by applying a torque and optionally a pressure force towards the positions where the components are to be joined. After step (d), the joined components are allowed to cool to ambient temperature, e.g., a temperature in the range of from 15 to 25° C. The cooling process can be enhanced by applying cooling techniques.

The thermoplastic fiber composite component can include a thermoplastic material selected from the group consisting of polyamide (PA), polyphenylene sulfide (PPS), polyetherketoneketone (PEKK), polyetheretherketone (PEEK), polypropylene (PP), polyethylene (PE), poly(styrene-butadiene-styrene) (SBS) and polyethyleneimine (PEI), preferably polyphenylene sulfide (PPS), and polyetherketoneketone (PEKK), polyetheretherketone.

The thermoplastic fiber composite component can be prepared by applying methods known in the art, e.g., by forming prepregs and curing same by applying heat and/or pressure. Other methods include press-forming, maybe even with stringers, consolidation in an autoclave, consolidation in an oven, and In-Situ consolidation (e.g., by laser, plasma, resistance heating).

The reinforcement fibers may be carbon fibers or glass fibers, high resistance modulus carbon fiber, e.g., AS, IM, HM, E Glass, T300, T800, and HS.

The thermoplastic material includes thermoplastic polymers, or a mixture of thermoplastic polymers with elastomers and/or thermoset polymers. The at least one of the thermoplastic fiber composite components preferably represents a carbon-fiber-reinforced plastic (CFRP) material.

The reinforcement fibers may be present as uni-directional layer(s), as fabrics or as laid webs. For the manufacture of a composite material component from a semi-finished composite material, the matrix surrounding the reinforcement fibers can be cured by using temperature and pressure. Frequently a pultrusion process is applied, which is a continuous process for manufacture of fiber-reinforced composite materials. The matrix may, for example, comprise a material that can be liquefied through heating. The reinforcement fibers may be in form of laminates, tubes or tapes. Preferably, the reinforcement fibers are present as tapes. These tapes may originate from spools which were used in an upstream manufacturing process and on which remainder material of reinforcement fibers is present, which would be disposed. This remainder material can be utilized in the preparation of bulk molding compounds and sheet molding compounds and thus in the production of composite materials.

The one or more components can, e.g., have a flat form at least at the positions where they are to be joined to each other, and are stacked over each other in step (b), preferably, the components have a thickness of up to 20 mm, preferably up to 4 mm The components can, e.g., have a panel or sheet form.

If a rivet is used, it can be called a "hot joint rivet." The head of a screw can, for example, be a countersink head, a spherical head, or a polyhedron head (see FIGS. 8a-8c). The thread can be dimensioned to be in all components which are positioned on top of each other, or to be only in the bottom component(s) leaving an unthreaded part at least in the top component(s) (see FIGS. 9a-9c). The fastener can extend through all components and can protrude beyond the joined components (see FIGS. 10a-10c).

The fastener or the further component can comprise a head at one end and an opposing end which can be deformed. This means that the fastener can be inserted in a one sided process (i.e., inserted from one side of the components which are positioned on top of each other) without requiring manipulating from another side, such as used with a blind fastener (see FIGS. 12a and 12b). The blind fastener comprises at least one component comprising a thread and a bolt to be inserted into the at least one component comprising a thread. The fastener can also be inserted by using a two sided process by inserting the fastener as in step (d) and providing a further component for securing the fastener at the opposing side.

In one embodiment, which can be combined with all aspects described herein, the method does not include drilling of a hole into the components prior to or during step (d), or at least does not include drilling of a hole into the thermoplastic fiber composite component(s) prior to or during step (d).

In such an embodiment, the method does not comprise using a drilling device for forming a hole, at least not a through hole, into the components to be joined. Applying holes at the surface for marking purposes can nevertheless be performed. Furthermore, the fastener has no cutting edges, in particular no cutting edges at its tip or side parts, e.g., at the thread, which could drill a hole during step (d), i.e., during the insertion of the fastener. Such an embodiment is preferred, since the fastener is inserted by shifting/moving the fibers aside (FIG. 6b) without (significantly) cutting the fibers, in contrast to a cutting of fibers like in conventional drilling (FIG. 6a).

The joined components are preferably components of a vehicle, such as an aircraft, a spacecraft, a train, a bus or a passenger ship/vessel. The joined components are particularly preferred components of an aircraft or spacecraft, and/or are selected from the group consisting of: skin, e.g., skin panel; stiffening elements such as circumferential stiffeners (frames) and/or stringers, doubles/reinforcements, window frames, floor structure components, such as cross beams, seat rails, Z-struts, X-paddles; door frames, intercostals, lintel and a mix of different parts thereof.

The number of joined components can, for example, be at least two, e.g., two, or at least three, e.g., three. The components can be made of the same material or can be made of a different material. The component which is not a thermoplastic fiber composite component can be made of plastic or metal.

The present invention also refers to the use of heat for softening a thermoplastic fiber composite component during screwing of a fastener comprising a thread into one or more components, wherein at least one of the one or more components is the thermoplastic fiber composite component. The use can include all features described in the context of the method of the invention herein.

The present invention further refers to a joined-together component(s) including a fiber composite component, preferably of a vehicle, aircraft or spacecraft, obtainable or obtained by the method of the present invention as described herein.

BRIEF DESCRIPTION OF THE DRAWINGS

Preferred embodiments of the method, use and joined components of the present invention are described in greater detail with reference to the attached schematic drawings in the following.

FIG. 1 shows the joined together component 10, wherein a fastener 13 is screwed into components 11 and 12. The fastener is shown in its final position. If desirable, the fastener can be cooled after reaching its final position.

FIG. 2 shows the embodiment of FIG. 1 after the fastener 13 is positioned but before it is screwed into components 11 and 12.

FIG. 3 shows the embodiment of FIGS. 1 and 2, wherein fastener 13 is heated before and optionally during screwed into components 11 and 12 in order to indirectly heat components 11 and 12 at the positions where they are to be joined. The arrows point to the heated part of fastener 13.

FIG. 7a shows two components 11 and 12, to be joined by fixed by a bolt and insert combination, wherein a threaded insert 113 (i.e., a component of the fastener comprising a thread) is screwed into component 12. The bolt has not yet been fully inserted.

FIG. 7b shows the embodiment of FIG. 7, wherein the bolt 120 has been fully inserted.

FIG. 12a shows two components 11 and 12, to be joined by a blind fastener/blind rivet, wherein a component 113 of the fastener comprising a thread which is screwed into components 11 and 12 and the fastener is fixed by inserting bolt 120 (i.e., a further component of the fastener not comprising a thread), which is not yet fully fixed.

FIG. 12b shows the embodiment of FIG. 12a, wherein the bolt 120 has been fully fixed.

FIG. 13c shows the embodiment of FIG. 13a with a polyhedron head 121.

FIG. 14a shows a fastener (insert) 113 which is screwed into component 12 and is fixed with a bolt 120 having a countersink head 121.

FIG. 16b shows different slot variants/star forms of head 14 of FIG. 16a.

FIG. 19a shows a cross-section of fastener 113 of FIGS. 18a-18c with a bolt 120 before being fully inserted.

FIG. 19b shows the embodiment of FIG. 19a with the bolt 120 being fully inserted.

FIG. 22b shows different head variants/forms, i.e., biangle, triangle, square, pentagon, hexagon and polygon of head 14 of FIG. 22a.

FIG. 23a shows a fastener 13 inserted in components 1 and 2 with a head 14, pointed to by arrow B.

FIG. 23b shows different head variants/star forms of head 14 of FIG. 23a.

DETAILED DESCRIPTION OF THE PREFERRED EMBODIMENTS

The following detailed description of the schematic drawings focuses on the illustrated implementation variants of a method of the invention, the use of the invention and the joined-together components of the invention. The present disclosure is not limited to the above and below described embodiments, but includes combinations thereof.

FIGS. 1-5 show the fastener 13 in the form of a screw. In FIG. 2, the screw has been brought into position, i.e., is positioned above the components at the location where these are to be joined. Components 11 and 12 have been positioned on top of each other. The use of a single component which is bent or folded to provide an overlapping section can provide the same setup as shown in FIGS. 1-5.

Figure 4:
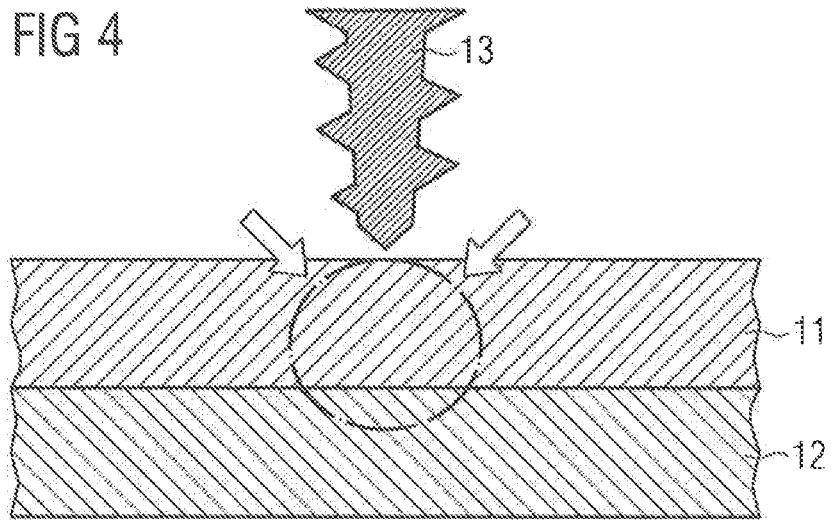
FIG. 4 shows the embodiment of FIGS. 1-3, wherein an inner part of components 11 and 12 (indicated by the arrows) is heated at positions where components 11 and 12 are to be joined. Heating can be performed before and/or during the screwing step.
Figure 5:
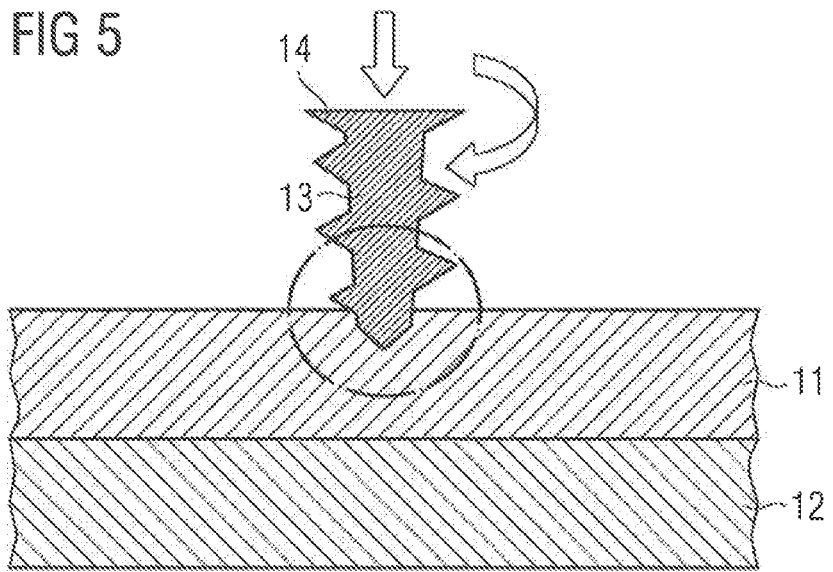
FIG. 5 shows the embodiment of FIGS. 1-4, wherein a pressure force is applied onto the head 14 of the fastener 13 towards the position where the components are to be joined (indicated by the arrow which is perpendicular to components 11 and 12), and wherein a torque/momentum force is applied to fastener 13 (indicated by the bent arrow).
Figure 6A:
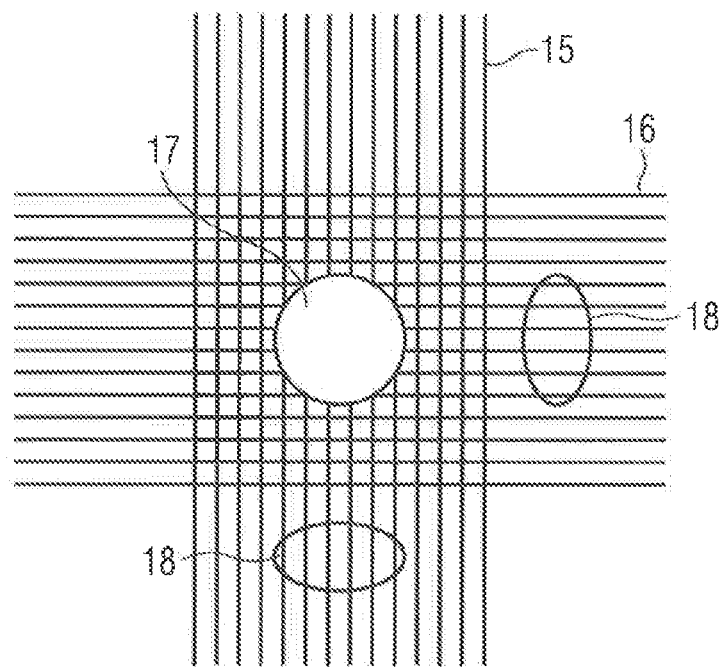
FIG. 6a shows an enlarged view on a thermoplastic fiber composite component after conventional drilling, wherein a drilled hole/through hole 17 has been formed. Composite fibers 15 and 16 are running perpendicular to each other and are cut by the drilling step and cut fibers 18 remain.
Figure 6B:
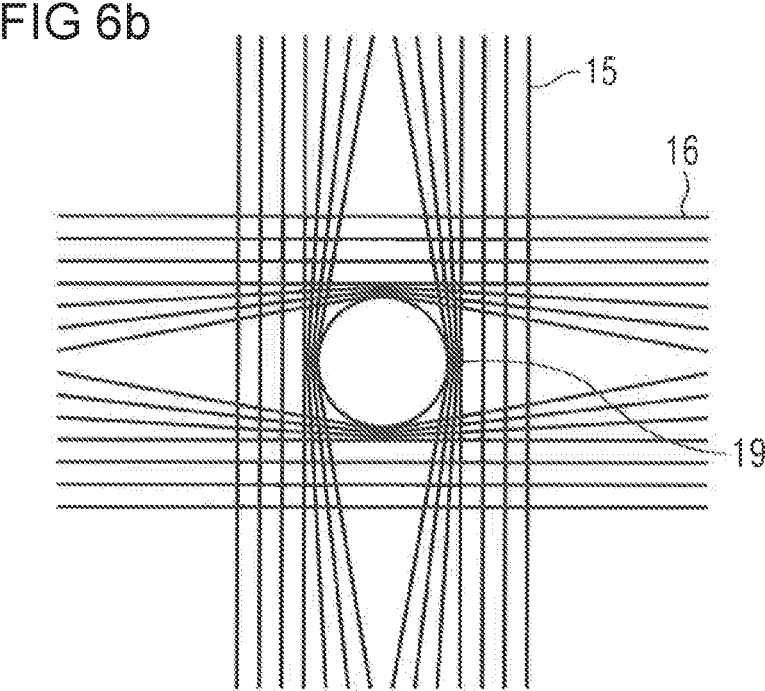
FIG. 6b shows an enlarged view on a thermoplastic fiber composite component after a fastener has been screwed into it, wherein moved fibers 19 remain, which are still (essentially) continuous, i.e., are not cut but are pushed aside by the fastener (not shown).
Figure 8A:
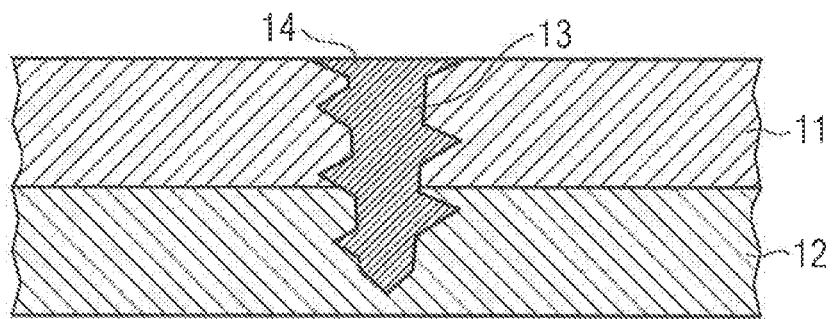
FIG. 8a shows a fastener in the form of a screw 13 with a countersink head 14, wherein the thread is in both components 11 and 12.
Figure 8B:
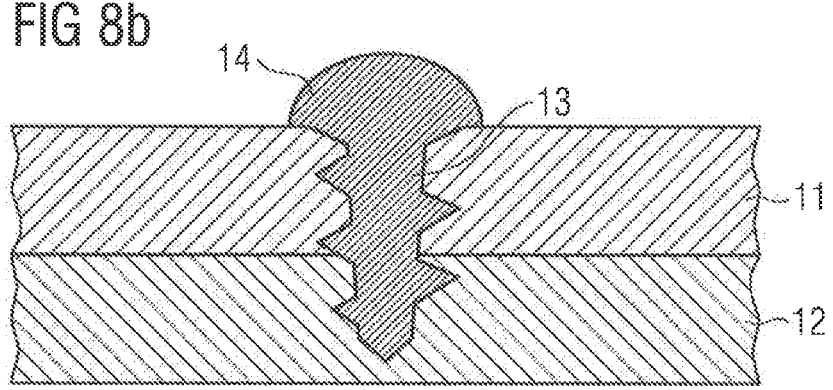
FIG. 8b shows a fastener in the form of a screw 13 with a spherical head 14, wherein the thread is in both components 11 and 12.
Figure 8C:
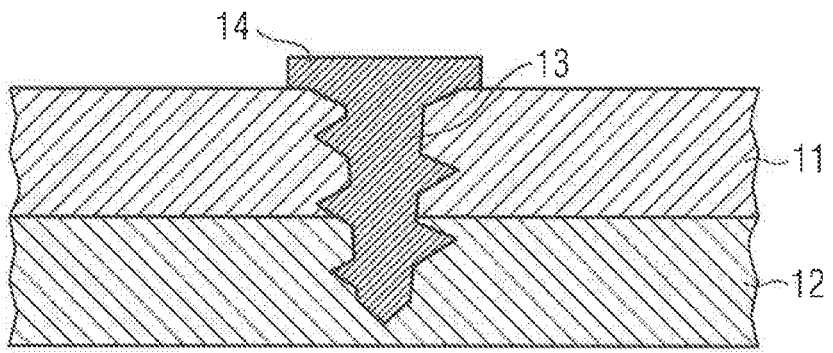
FIG. 8c shows a fastener in the form of a screw 13 with a polyhedron head 14, wherein the thread is in both components 11 and 12.
Figure 9A:
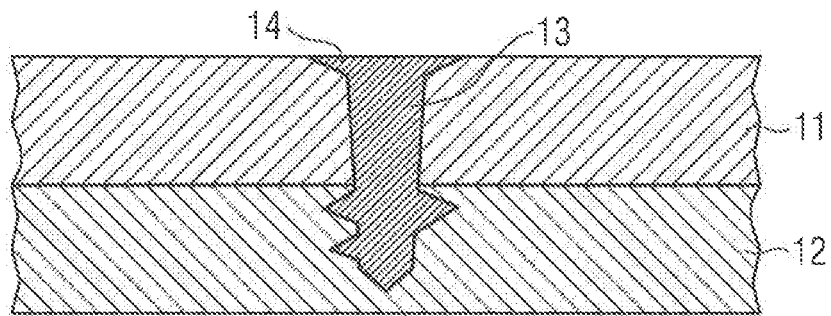
FIG. 9a shows a fastener in the form of a screw 13 with a countersink head 14 and a thread only in component 12.
Figure 9B:
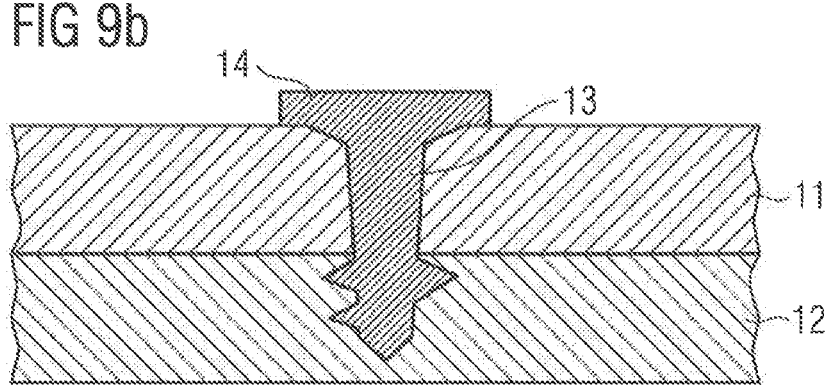
FIG. 9b shows a fastener in the form of a screw 13 with a polyhedron head 14 and a thread only in component 12.
Figure 9C:
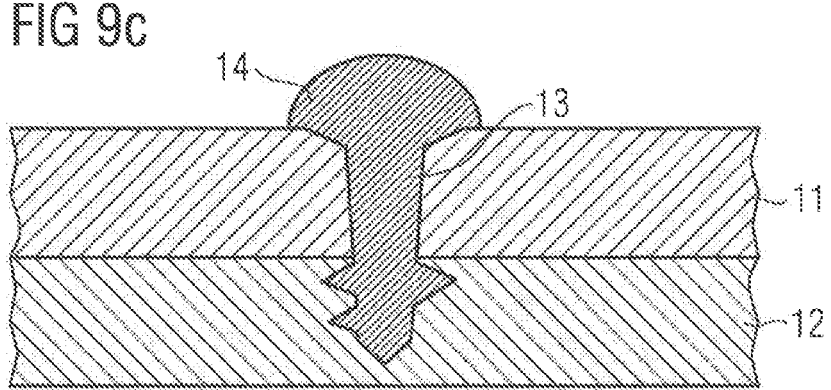
FIG. 9c shows a fastener in the form of a screw 13 with a spherical head 14 and a thread only in component 12.
Figure 10A:
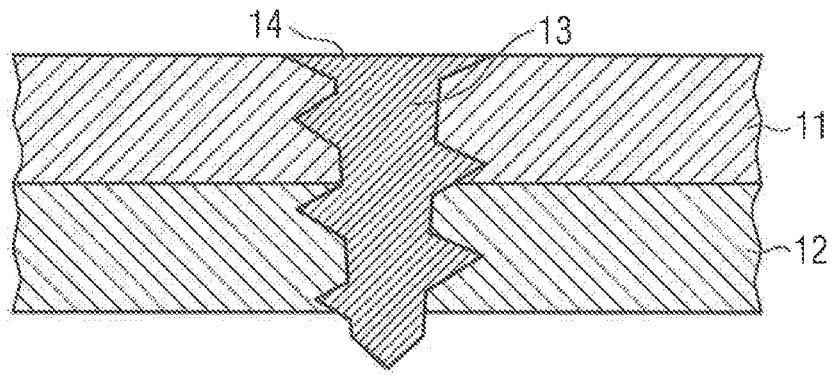
FIG. 10a shows a fastener in the form of a screw 13 with a countersink head 14, wherein the screw 13 goes through both components 11 and 12 and even protrudes beyond them.
Figure 10B:
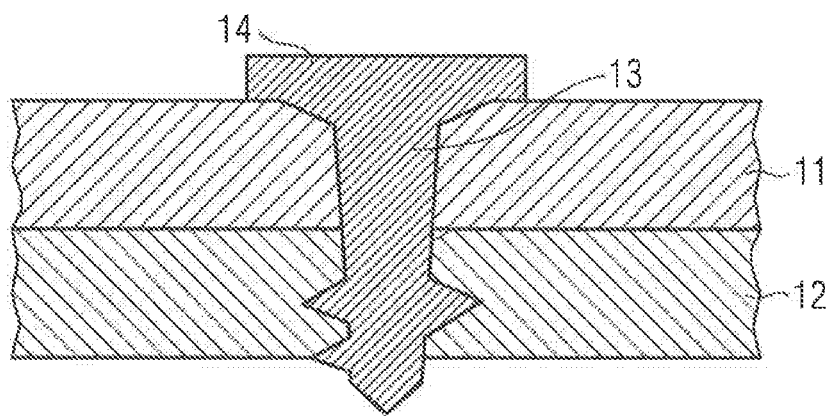
FIG. 10b shows the embodiment of FIG. 10a with a polyhedron head 14.
Figure 10C:
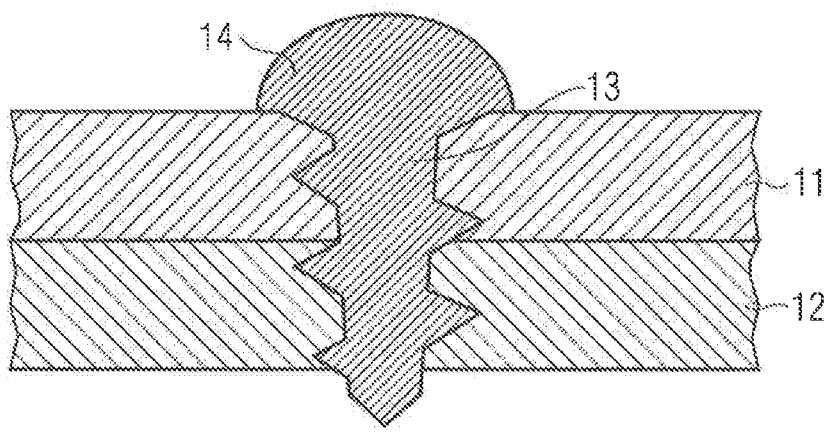
FIG. 10c shows the embodiment of FIG. 10a with a spherical head 14.

FIG. 6 shows the difference between prior art drilling methods (FIG. 6a) and the method of the present invention (FIG. 6b). When comparing the figures, the structural differences between prior art products and the products of the present invention, resulting from the processes of joining according to the invention, become apparent. These differences may be determined by microscopy, e.g., scanning electron microscopy.

FIGS. 7a and 7b show two components 11 and 12, to be joined by a bolt and insert combination. Component 11 is joined with component 12 by inserting bolt 120 (i.e., a further component which can optionally also comprise a thread) into the insert 113. The bolt can be screwed or hammered into the insert.

Figure 11A:
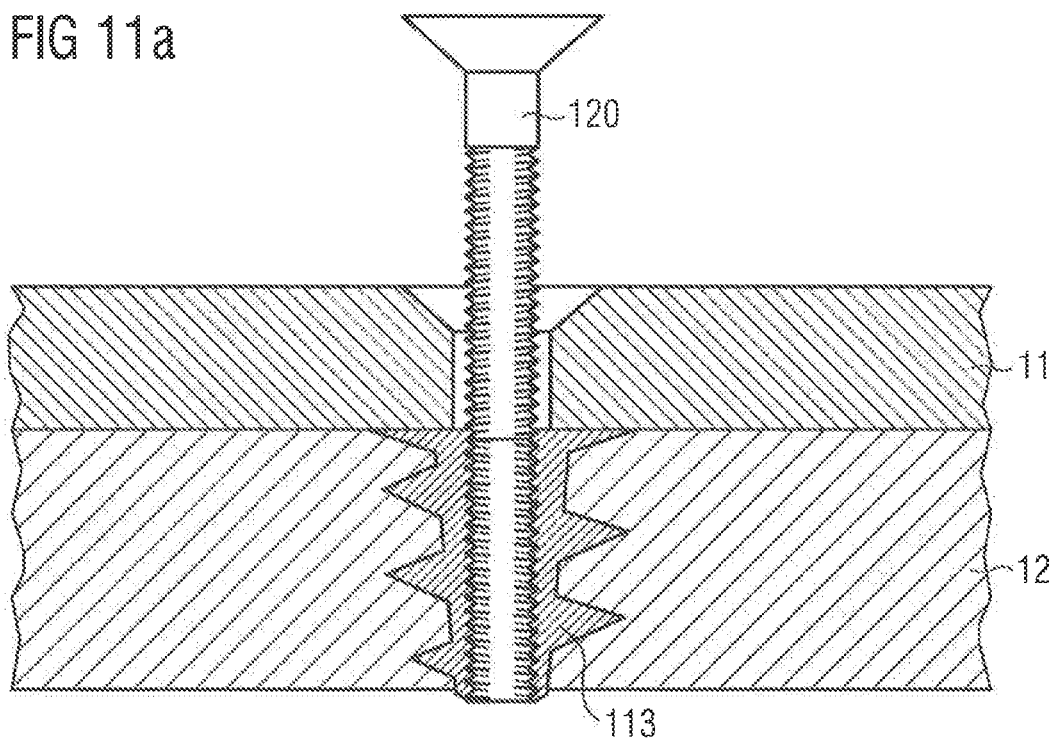
FIG. 11a shows two components 11 and 12, to be joined by screwing of bolts, wherein a component 113 of the fastener comprising a thread is screwed into component 12 to join it with component 11 by inserting bolt 120, which is not yet fully inserted (i.e., a further component of the fastener not comprising a thread), wherein the threaded component 113 protrudes beyond the components.
Figure 11B:
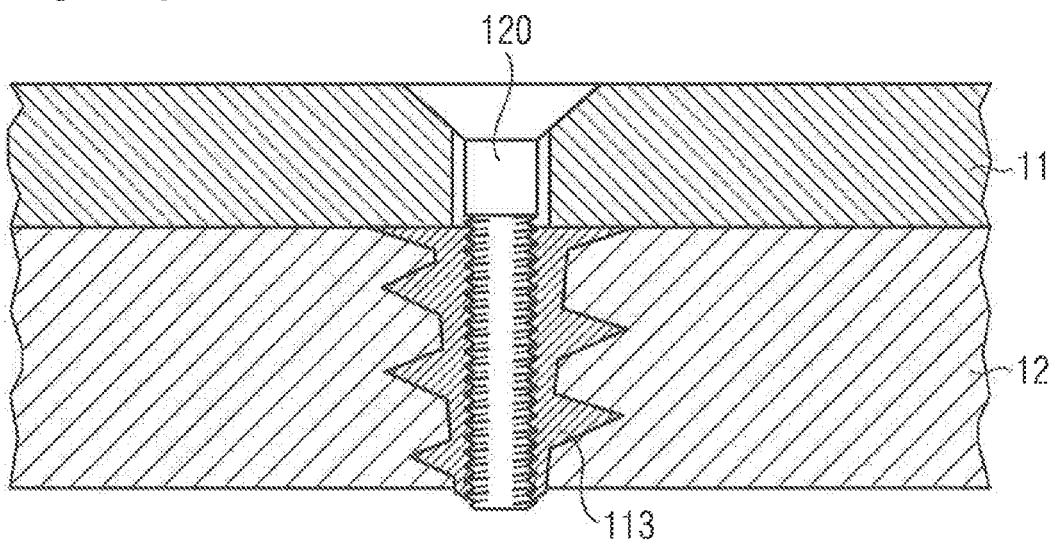
FIG. 11b shows the embodiment of FIG. 11a, wherein the bolt 120 has been fully inserted.
Figure 13A:
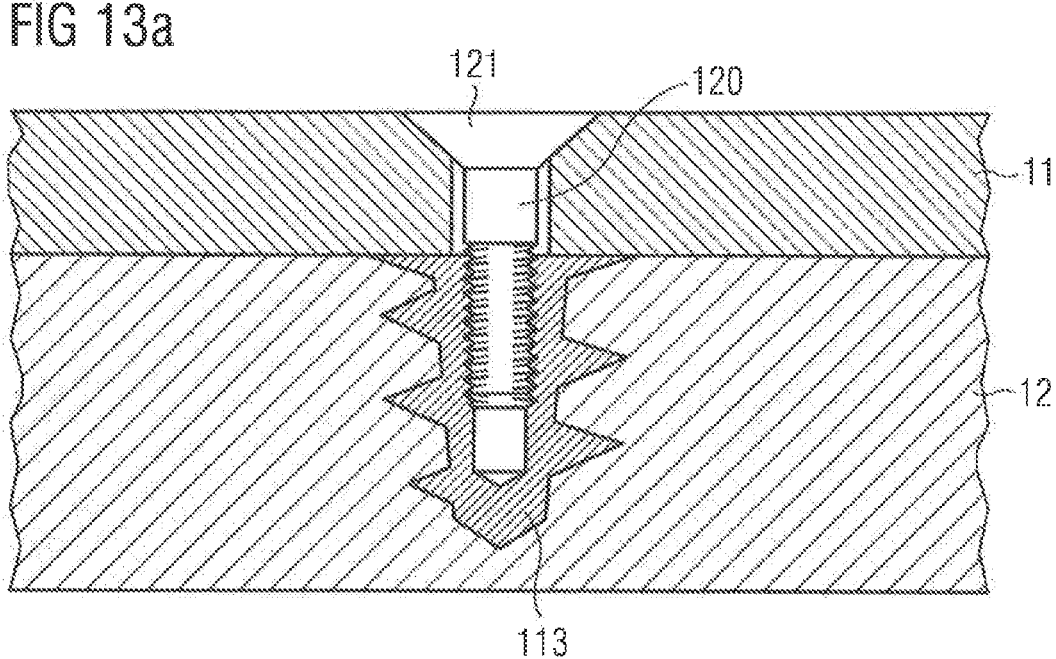
FIG. 13a shows a fastener with two components, wherein one component 113 comprises a thread and is screwed into the bottom component 12, and a further component 120 which is a bolt with a countersink head 121.
Figure 13B:
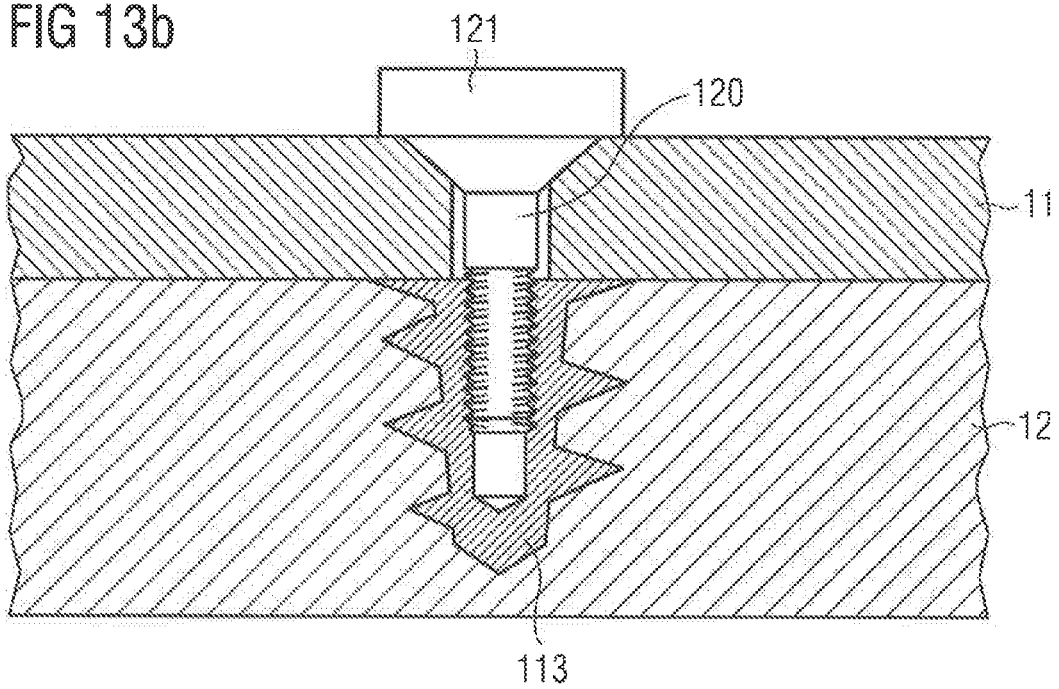
FIG. 13b shows the embodiment of FIG. 13a with a spherical head 121.
Figure 14B:
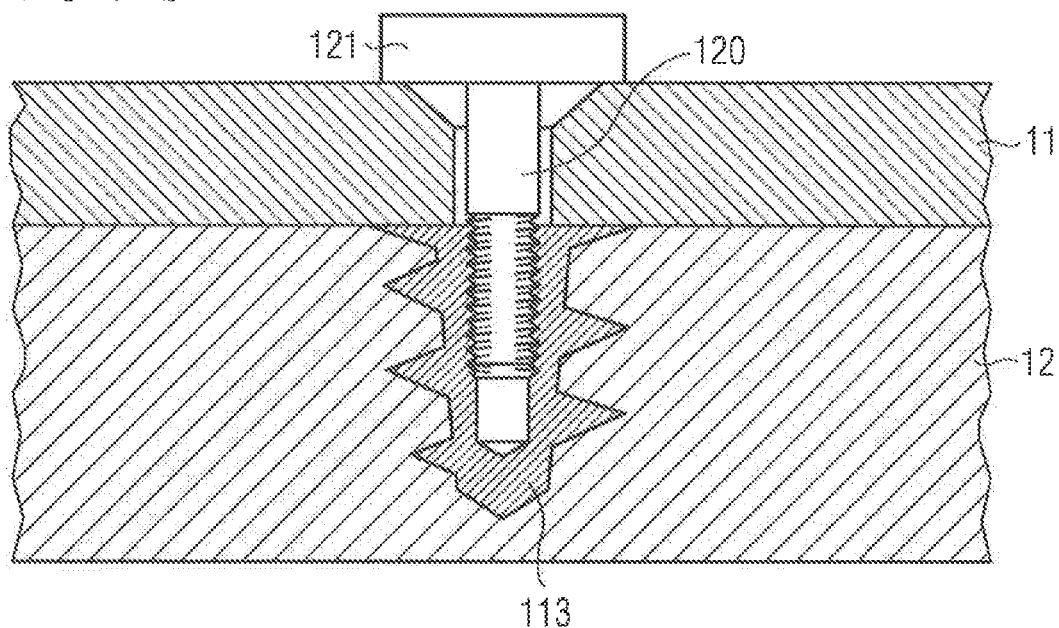
FIG. 14b shows the embodiment of FIG. 14a with a different head 121 and bolt 120 variant.
Figure 14C:
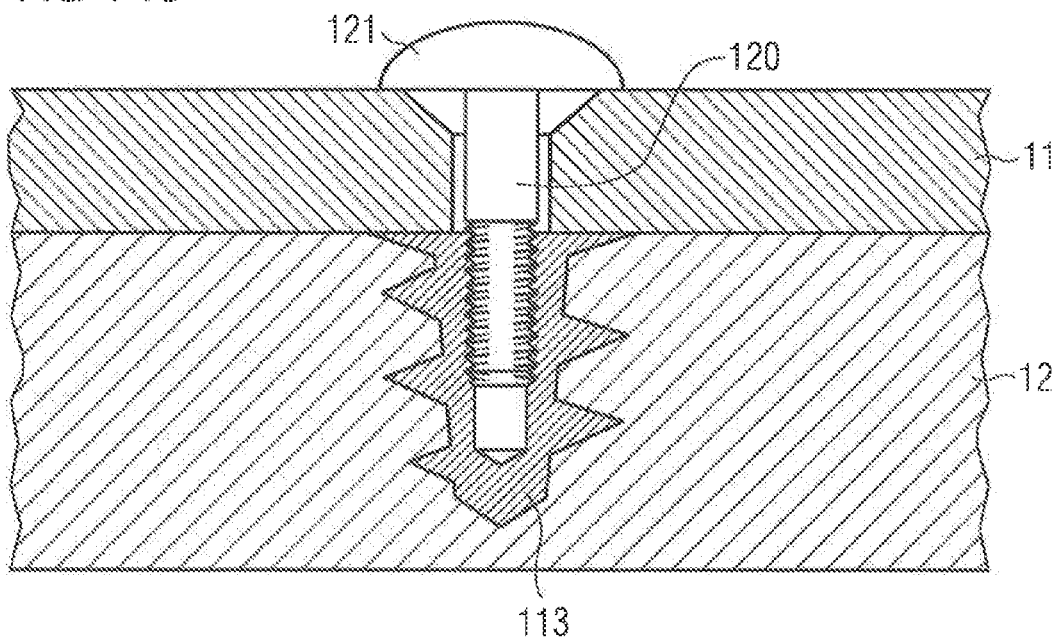
FIG. 14c shows the embodiment of FIG. 14a with a different head 121 and bolt 120 variant.
Figure 14D:
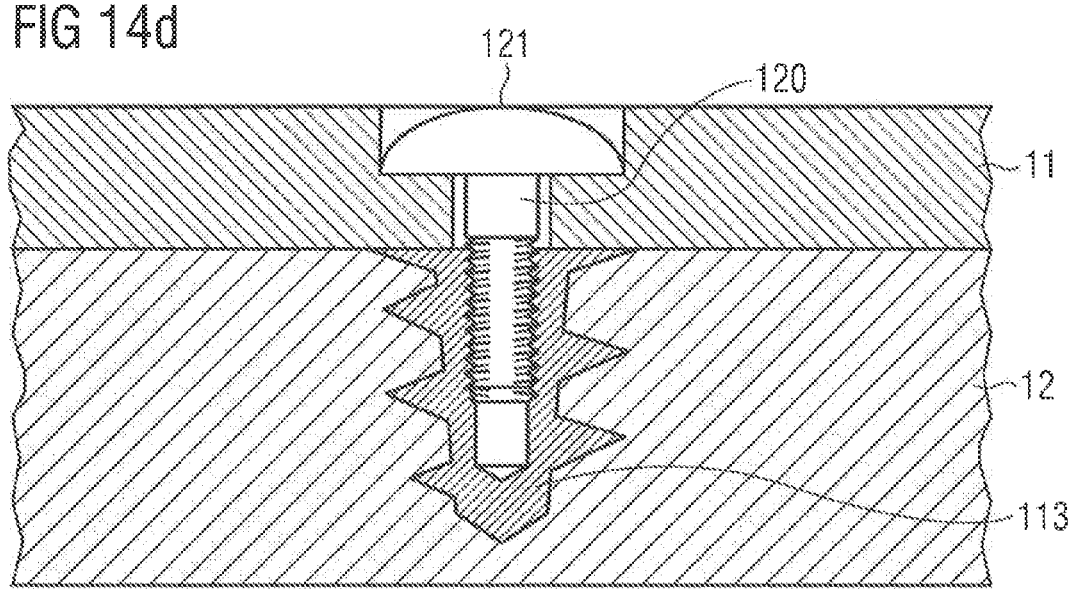
FIG. 14d shows the embodiment of FIG. 14a with a different head 121 and bolt 120 variant.
Figure 15A:
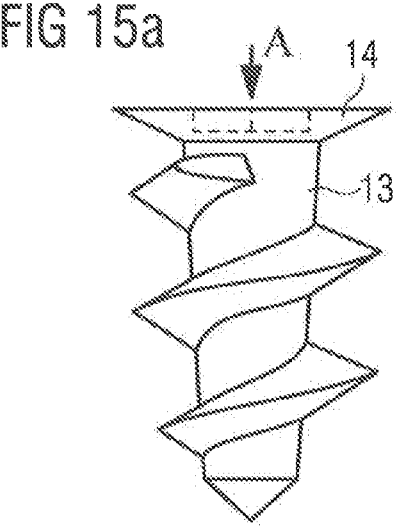
FIG. 15a shows a fastener 13, wherein arrow A shows the slot(s) in the fastener head 14.
Figure 15B:
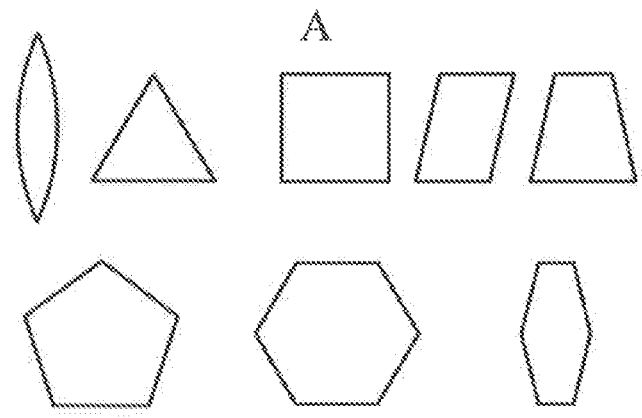
FIG. 15b shows different slot variants/forms of head 14 of FIG. 15a, i.e., biangle, triangle, square, pentagon, hexagon and polygon.
Figure 16A:
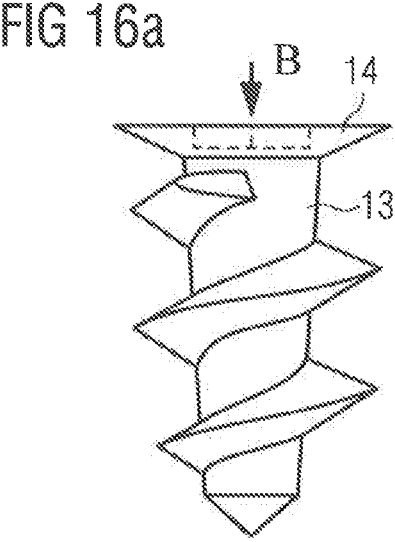
FIG. 16a shows a fastener 13, wherein arrow B shows the slot(s) in the fastener head 14.
Figure 16B:
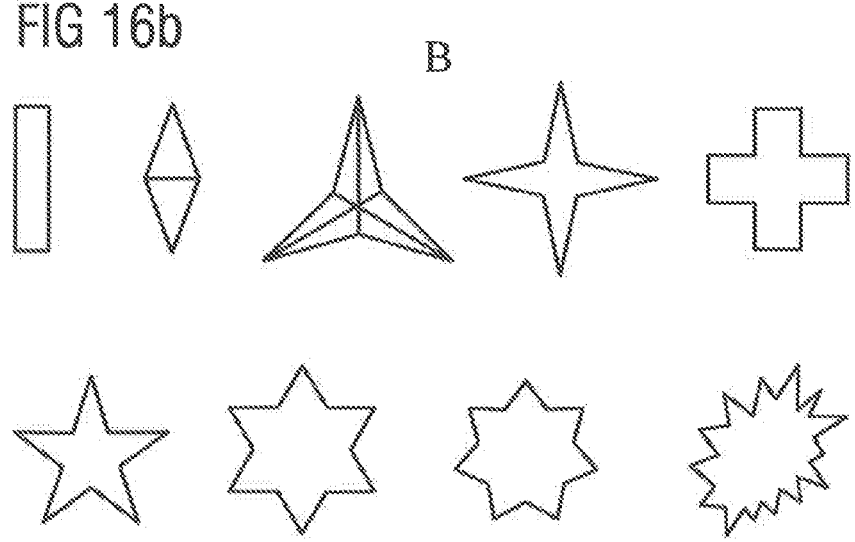
Figure 17A:
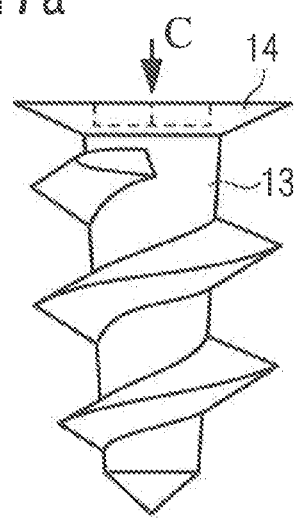
FIG. 17a shows a fastener 13, wherein arrow C shows the slot(s) in the fastener head 14.
Figure 17B:
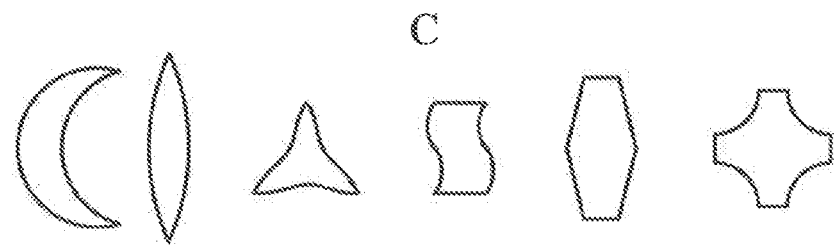
FIG. 17b show different slot variants/forms, being a mix of the forms of head 14 of FIGS. 15 and 16.
Figure 18A:
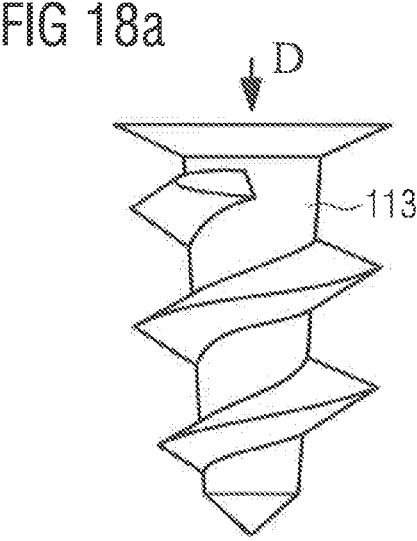
FIG. 18a shows a fastener 113, wherein arrow D shows the location of a partial inner thread at the location.
Figure 18B:
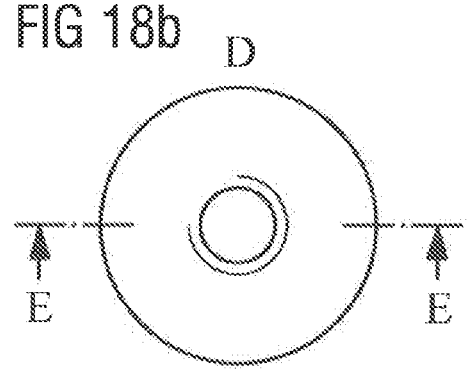
FIG. 18b shows the top view of FIG. 18a on the partial inner thread.
Figure 18C:
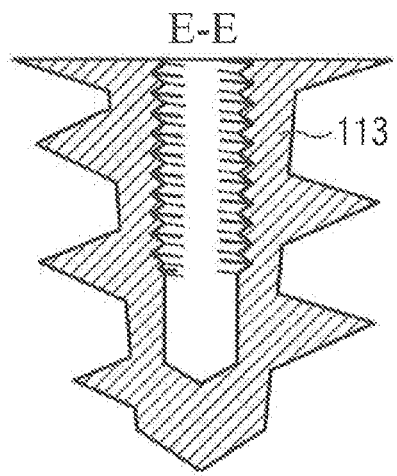
FIG. 18c shows a cross-section of the fastener 113 of FIGS. 18a and 18b.
Figure 20A:
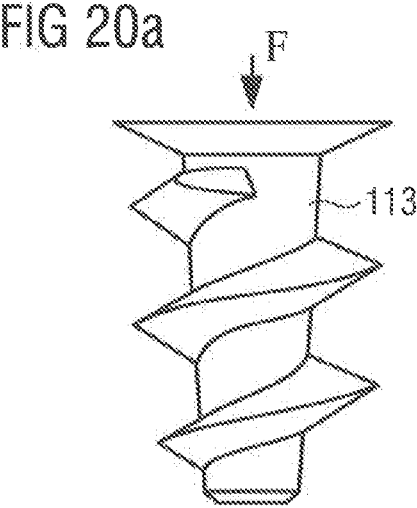
FIG. 20a shows a fastener 113, wherein arrow F shows the location of an inner thread at the location.
Figure 20B:
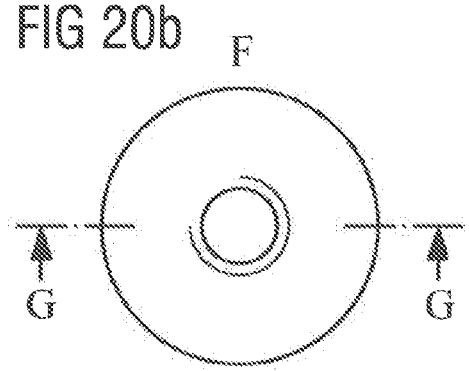
FIG. 20b shows the top view of FIG. 20a on the inner thread.
Figure 20C:
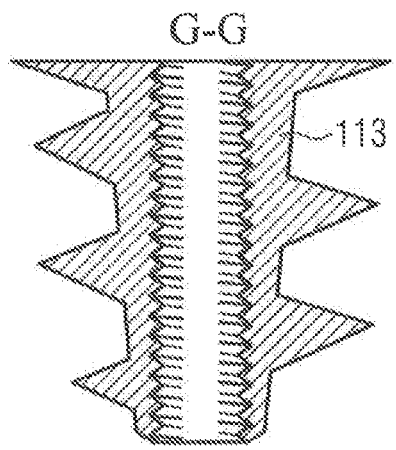
FIG. 20c shows a cross-section of fastener 113 of FIGS. 20a and 20b.
Figure 21A:
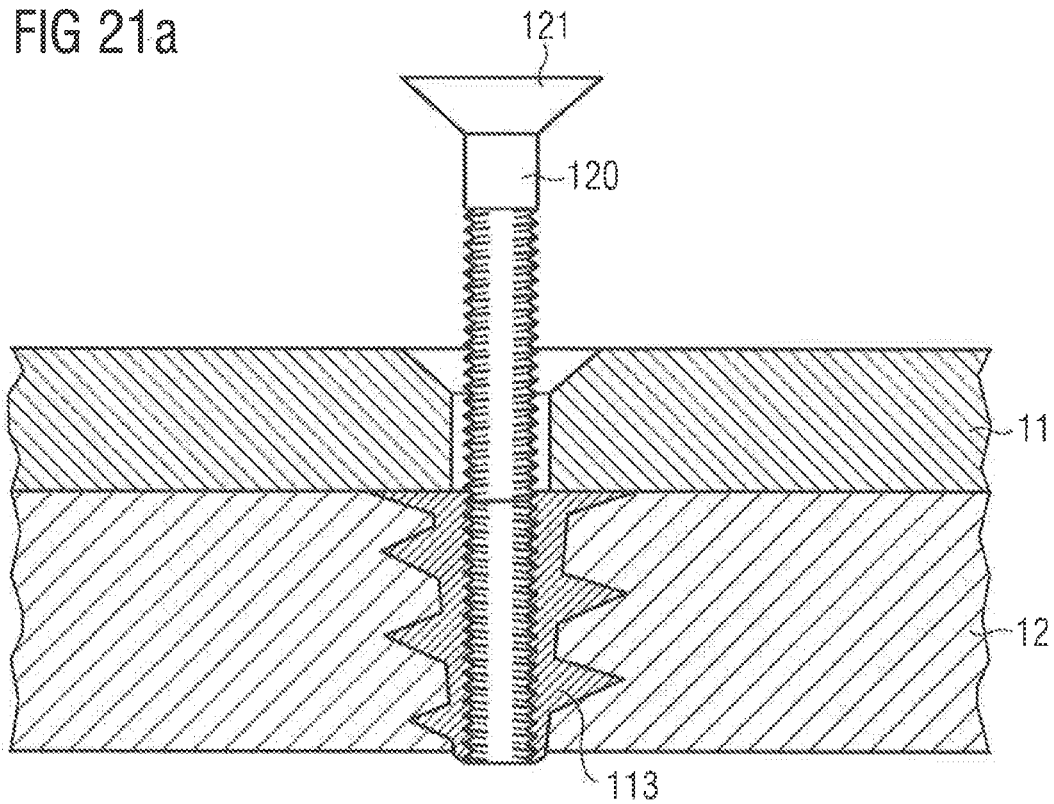
FIG. 21a shows a cross-section of the fastener 113 of FIGS. 20a-20c with a bolt 120 before being fully inserted.
Figure 21B:
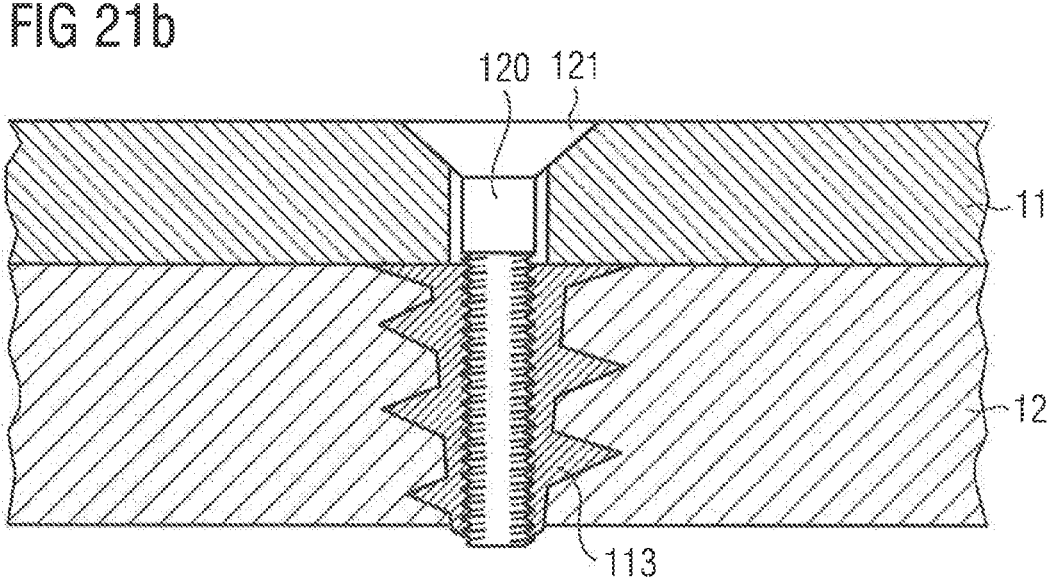
FIG. 21b shows the embodiment of FIG. 21a with the bolt 120 being fully inserted.
Figure 22A:
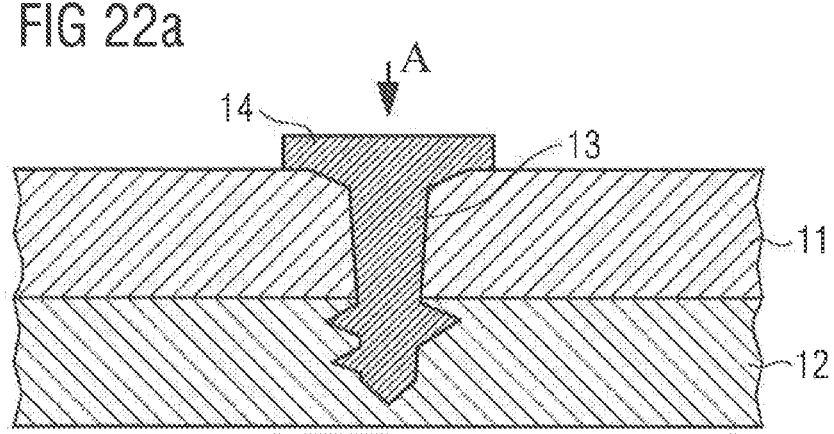
FIG. 22a shows a fastener 13 inserted in components 1 and 2 with a head 14, pointed to by arrow A.
Figure 22B:
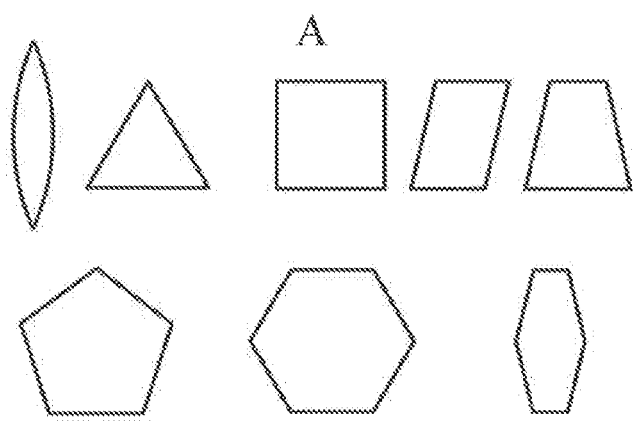
Figure 24A:
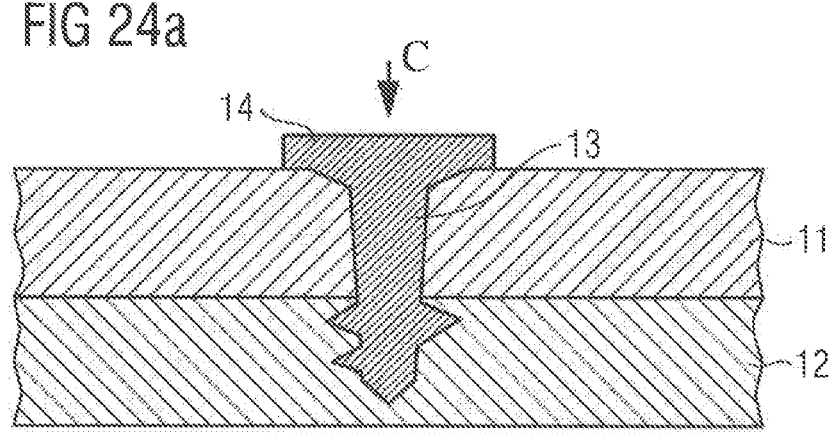
FIG. 24a shows a fastener 13 inserted in components 1 and 2 with a head 14, pointed to by arrow C.
Figure 24B:
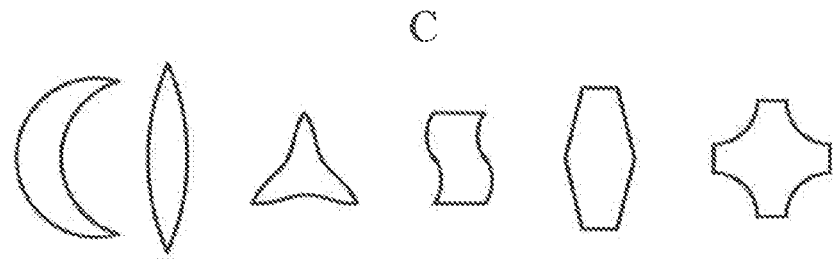
FIG. 24b shows different head variants/forms based on mixtures of the forms of head 14 of FIGS. 22 and 23.
Figure 25:
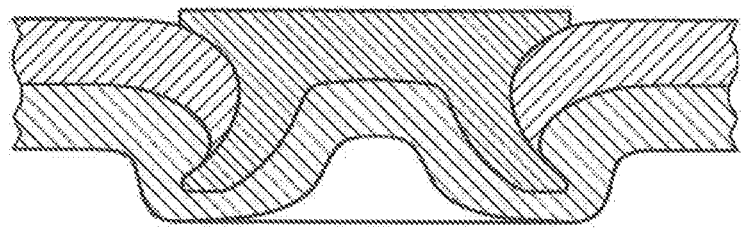
FIG. 25 shows a prior art self-piercing rivet.
Figure 26A:
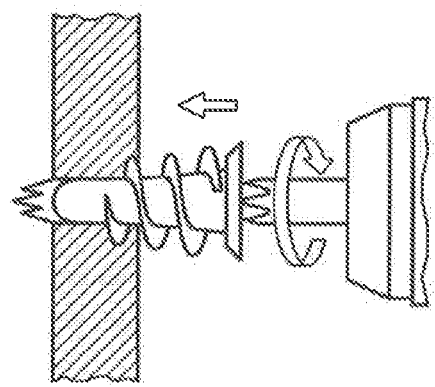
FIG. 26a shows a prior art fastener with cutting edges which is inserted into a component, thereby forming a through hole.
Figure 26B:
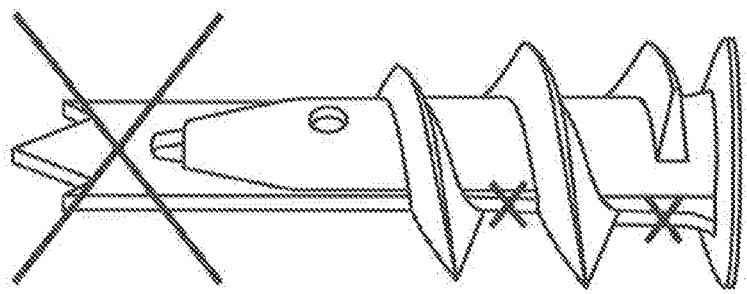
FIG. 26b shows a prior art fastener showing that the cutting edges are removed/not present according to the present application.

FIGS. 11a and 11b show an embodiment which is similar to the embodiment of FIGS. 7a and 7b. However, in FIGS. 11a and 11b, the threaded component 113 protrudes beyond the components.

EXAMPLE

A test was performed with PPS (polyphenylene sulfide) material. This material is used in A350 clips and cleats. The material PPS had a melting temperature of about 285° C. A woodscrew having a length of 16 mm and a cross recess was inserted by using a manual screwdriver and a blowtorch for heating. The temperature of the sheet was controlled by distance temperature measurement by means of IR measurement with laser steering (range: −50° C. up to 900° C.). Upon heating to a temperature of about 200° C. it was possible to screw with minimal forces without destroying the fibers. After removal of the screw a good quality of the holes were observed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 10 joined-together components
11 component to be joined
12 component to be joined
13 fastener comprising a thread
14 fastener head
15 composite fiber
16 composite fiber
17 drilled hole/through hole
18 cut fibers
19 moved fibers
113 fastener in form of a threaded insert
120 bolt
121 bolt head

The invention claimed is:

1. A method for joining together different components or different sections of a single component, comprising the steps of:
   a) providing one or more components, wherein at least one of the components is a thermoplastic fiber composite component, to be joined together at one or more positions, and a fastener comprising a thread, or at least one fastener component, which comprises a thread, wherein the fastener is a screw and the at least one fastener component, which comprises a thread, is an insert of a rivet,
   b) positioning said one or more components, or sections of a single one of the one or more components, on top of each other,
   c) heating at least one of
      at least a portion of the one or more components, and optionally also portions of other of the one or more components to be joined, at one or more positions where the thermoplastic fiber components are to be joined, or
      said fastener or said at least one fastener component, and
   d) screwing said fastener, or said at least one fastener component, into at least a bottom thermoplastic fiber component at the one or more positions,
   wherein a further fastener component is fixed to said at least one fastener component, to join the one or more thermoplastic fiber components together, wherein the further fastener component is a bolt or a nut,
   wherein step (c) is performed at least one of prior to or during step (d).

2. The method according to claim 1, wherein the one or more thermoplastic fiber composite components includes a thermoplastic material selected from the group consisting of polyamide (PA), polyphenylene sulfide (PPS), polyetherketoneketone (PEKK), polyetheretherketone (PEEK), polypropylene (PP), polyethylene (PE), poly(styrene-butadiene-styrene) (SBS), polyethyleneimine (PEI), preferably polyphenylene sulfide, polyetherketoneketone, and polyetheretherketone.

3. The method according to claim 1, wherein the one or more thermoplastic fiber composite components comprise continuous fibers.

4. The method according to claim 1, wherein said fastener, said at least one fastener component and said further fastener component is predominantly made of a metal or a metal alloy.

5. The method according to claim 1, wherein said one or more thermoplastic fiber composite components have a flat form, at least at the positions where they are to be joined to each other when they are stacked over each other in step (b).

6. The method according to claim 1, wherein the heating in step (c) is performed with at least one of ultrasound, hot air, microwave radiation, laser radiation, electric current, electromagnetic induction, or infrared radiation.

7. The method according to claim 1, wherein the heating is performed at at least one of:
   (i) one surface or opposing surfaces of the one or more thermoplastic fiber composite components, which are positioned on top of each other, at positions where the components are to be joined; or
   (ii) at an inner part of one or more of said one or more thermoplastic fiber composite components which are to be joined.

8. The method according to claim 1, wherein said further fastener component is a bolt.

9. The method according to claim 1, wherein the thread of said fastener or of said at least one fastener component is dimensioned:
   to extend through all thermoplastic fiber composite components which are positioned on top of each other, or
   to extend into only in the bottom thermoplastic fiber composite component and optionally further thermoplastic fiber composite components, but not in a top thermoplastic fiber composite component, leaving an unthreaded part at least in said top thermoplastic fiber composite component.

10. The method according to claim 1, wherein said at least one fastener component is screwed into all thermoplastic fiber composite components which are positioned on top of each other, or is screwed only into the bottom thermoplastic fiber composite component.

11. The method according to claim 1, wherein said fastener, said at least one fastener component and said further fastener component, extends through all thermoplastic fiber composite components.

12. The method according to claim 1, wherein the method does not include drilling of a hole into the one or more thermoplastic fiber composite components prior to or during step (d).

13. The method according to claim 1, wherein said fastener, or said further fastener component comprises a head at one end and an opposing end which can be deformed.

14. The method according to claim 1, wherein at least one of the one or more thermoplastic fiber composite components comprises a carbon-fiber-reinforced plastic material.

15. The method according to claim 1, wherein the joined components are components of a vehicle, aircraft or spacecraft.

16. The method according to claim 1, wherein the joined components are structural components selected from the group consisting of: skin, stiffening elements, doubles/reinforcements, window frames, floor structure components, seat rails, Z-struts, X-paddles, door frames, intercostals, lintel and a mix of different parts thereof.

17. The method according to claim 1, wherein the number of joined thermoplastic fiber composite components is at least two.

18. An assembly of one or more different components or different sections of a single one of the one or more components, comprising:
   at least one of the one or more components is a thermoplastic fiber composite component,
   the at least one thermoplastic fiber composite component is joined together at one or more positions with a fastener comprising a thread, or at least one fastener component, which comprises a thread, wherein the fastener is a screw and the at least one fastener component, which comprises a thread, is an insert of a rivet,
   wherein a further fastener component is fixed to said at least one fastener component, to join the one or more thermoplastic fiber components together, wherein the further fastener component is a bolt or a nut.

19. The assembly according to claim 18, wherein said further fastener component is a bolt.

* * * * *